US009716965B2

(12) United States Patent
Kim et al.

(10) Patent No.: US 9,716,965 B2
(45) Date of Patent: Jul. 25, 2017

(54) MOBILE TERMINAL AND CONTROLLING METHOD THEREOF

(71) Applicant: LG ELECTRONICS INC., Seoul (KR)

(72) Inventors: Kiwan Kim, Seoul (KR); Jonghwan Kim, Seoul (KR); Jaeyoung Chae, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/259,981

(22) Filed: Apr. 23, 2014

(65) Prior Publication Data
US 2014/0323120 A1    Oct. 30, 2014

Related U.S. Application Data

(60) Provisional application No. 61/816,701, filed on Apr. 27, 2013.

(30) Foreign Application Priority Data

Apr. 30, 2013 (KR) .......................... 10-2013-0048327

(51) Int. Cl.
*H04W 4/02* (2009.01)
*H04W 4/00* (2009.01)
(Continued)

(52) U.S. Cl.
CPC .......... *H04W 4/005* (2013.01); *H04L 65/1059* (2013.01); *H04L 65/1089* (2013.01);
(Continued)

(58) Field of Classification Search
CPC ..... H04W 4/005; H04W 4/023; H04W 4/008; H04W 4/206; H04L 65/1059; H04L 65/4015; H04L 65/1089; H04M 7/0024
See application file for complete search history.

(56) References Cited

U.S. PATENT DOCUMENTS

| 2010/0104106 A1* | 4/2010 | Son ......................... G10L 25/48 381/17 |
| 2011/0191183 A1* | 8/2011 | Jones ................. G06Q 30/0257 705/14.55 |

(Continued)

FOREIGN PATENT DOCUMENTS

| EP | 1 708 467 A1 | 10/2006 |
| EP | 2 312 821 A1 | 4/2011 |
| EP | 2 472 997 A1 | 7/2012 |

OTHER PUBLICATIONS

European Search Report issued in related foreign application No. 14166117.3 dated Jun. 27, 2014.

*Primary Examiner* — Marcos Torres

(74) *Attorney, Agent, or Firm* — KED & Associates LLP

(57) ABSTRACT

A mobile terminal and controlling method thereof are disclosed, by which a content sharing between a mobile terminal and a call counterpart is facilitated in the course of making a phone call in-between. The present invention includes a wireless communication unit configured to perform a communication with an external terminal device while the external terminal is currently in a phone call with a call counterpart, a touchscreen configured to display a content list of contents to share with the call counterpart, and a controller to control the touchscreen, wherein in response to receiving a user input to request a sharing of at least one content in the content list, the controller to control a request, to the external terminal device, to share the sharing requested content with the call counterpart.

11 Claims, 17 Drawing Sheets

(51) Int. Cl.
*H04L 29/06* (2006.01)
*H04M 7/00* (2006.01)
*H04W 4/20* (2009.01)

(52) U.S. Cl.
CPC ...... *H04L 65/4015* (2013.01); *H04M 7/0024* (2013.01); *H04W 4/023* (2013.01); *H04W 4/206* (2013.01); *H04W 4/008* (2013.01)

(56) References Cited

U.S. PATENT DOCUMENTS

2012/0265825 A1* 10/2012 Sandberg ............. H04W 4/023
  709/206
2012/0269185 A1* 10/2012 Castleman et al. ........... 370/352
2013/0226914 A1* 8/2013 Kurabayashi ..... G06F 17/30115
  707/723

\* cited by examiner

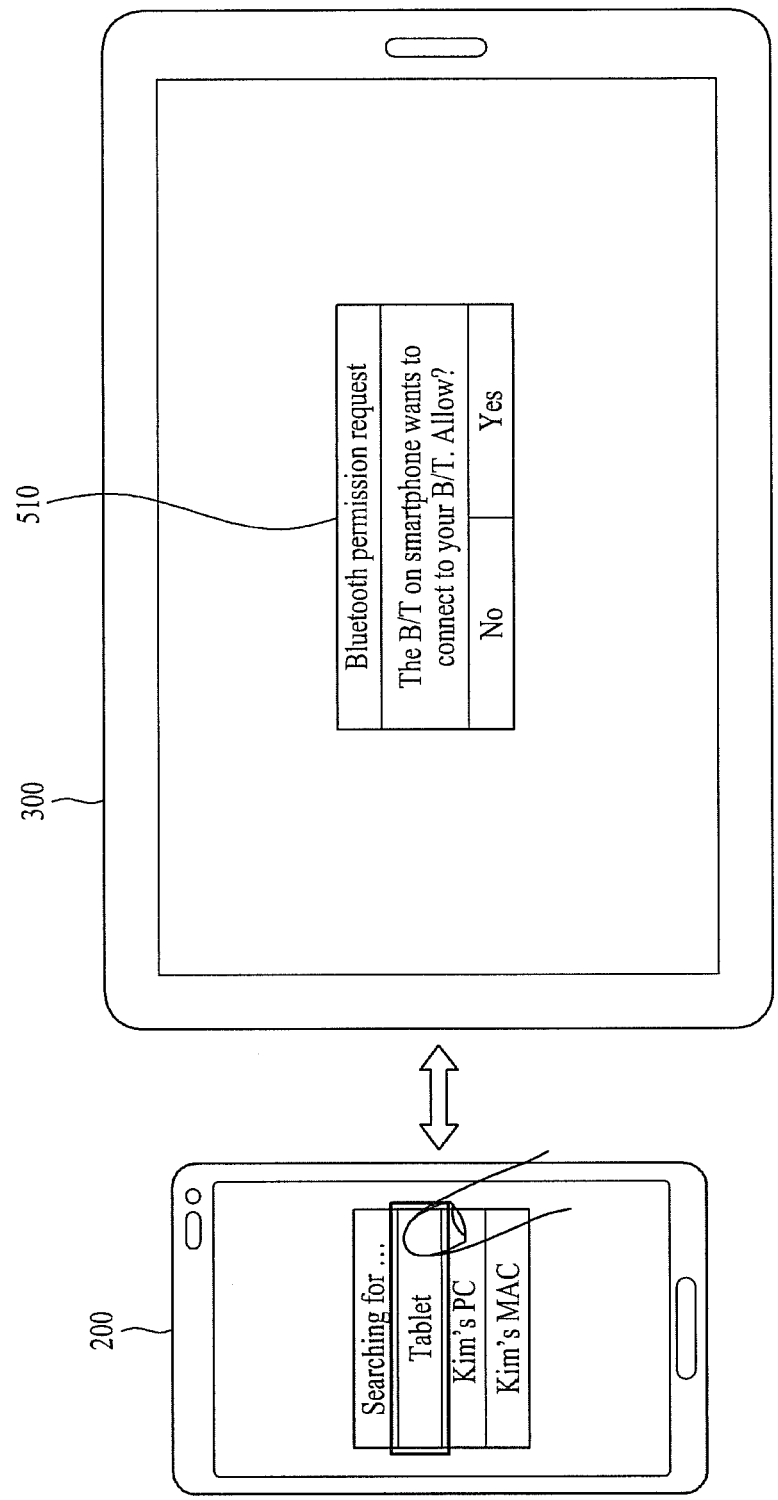

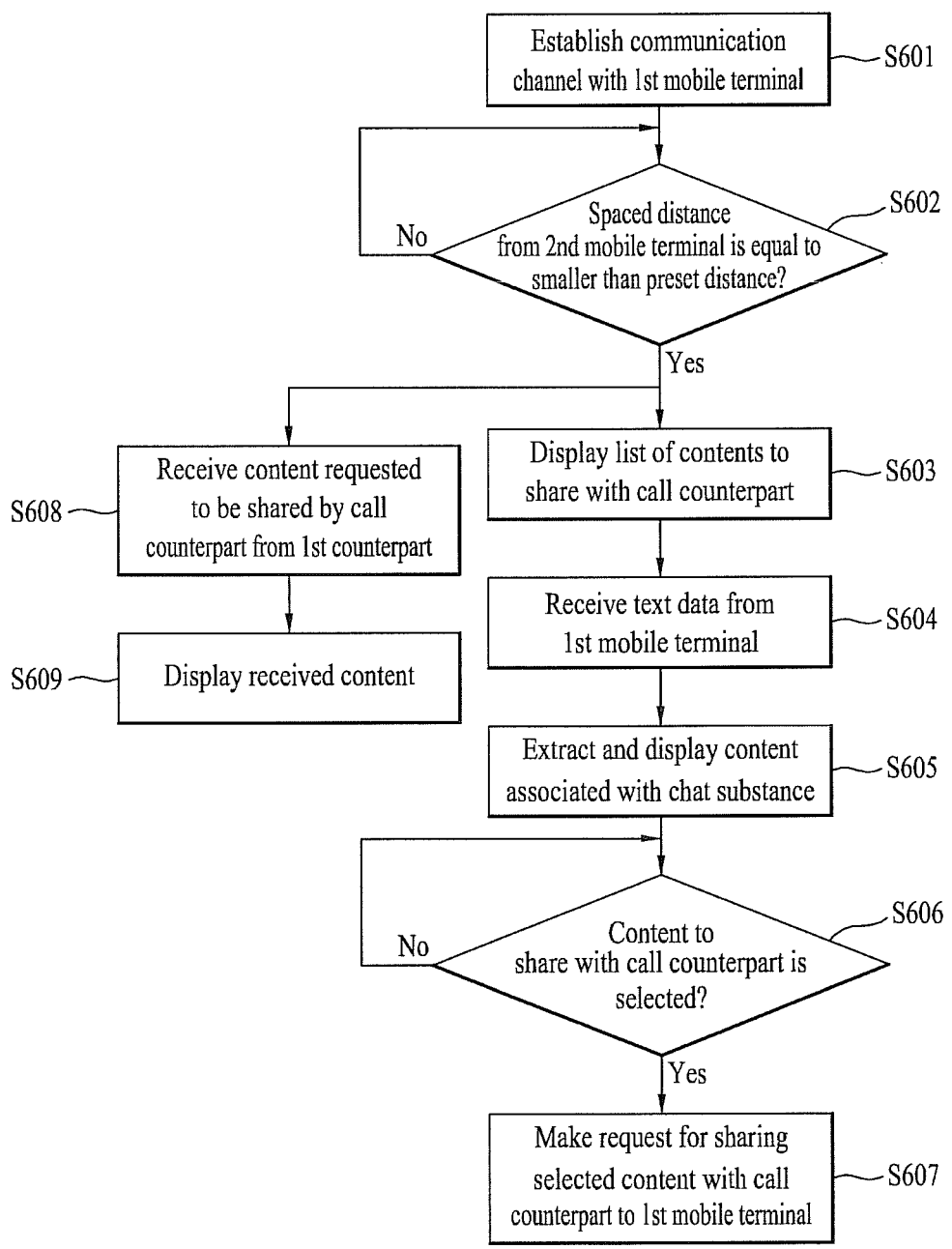

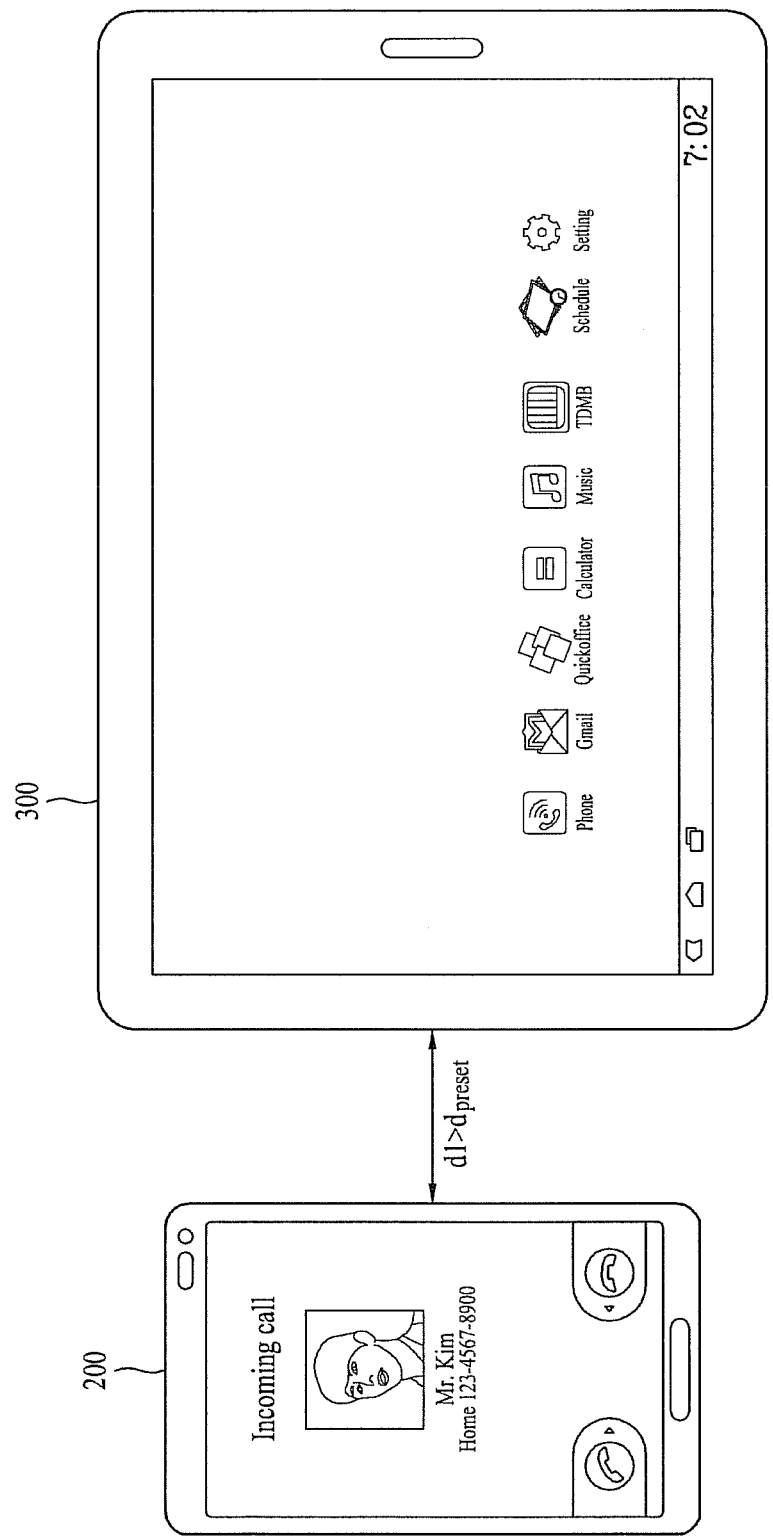

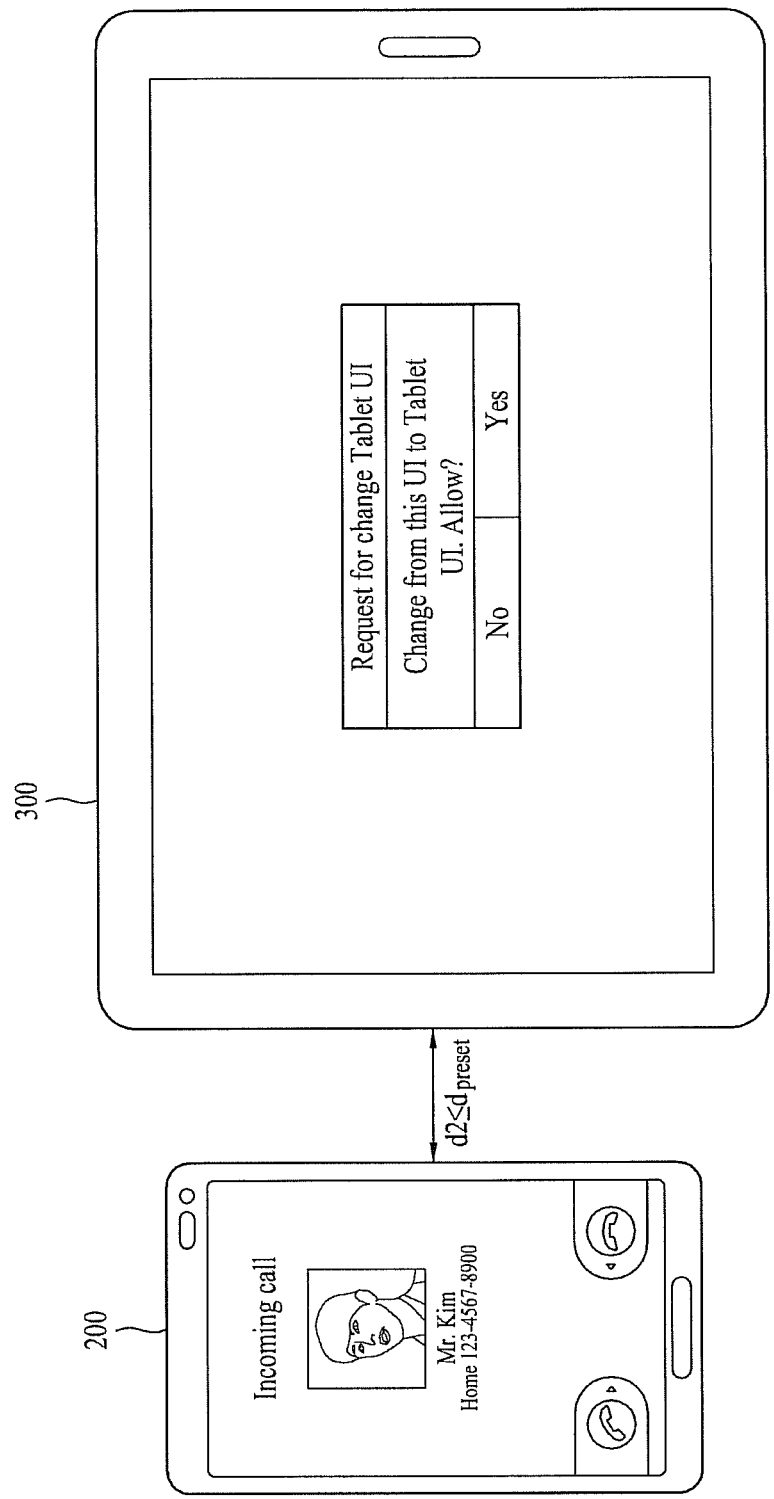

FIG. 12
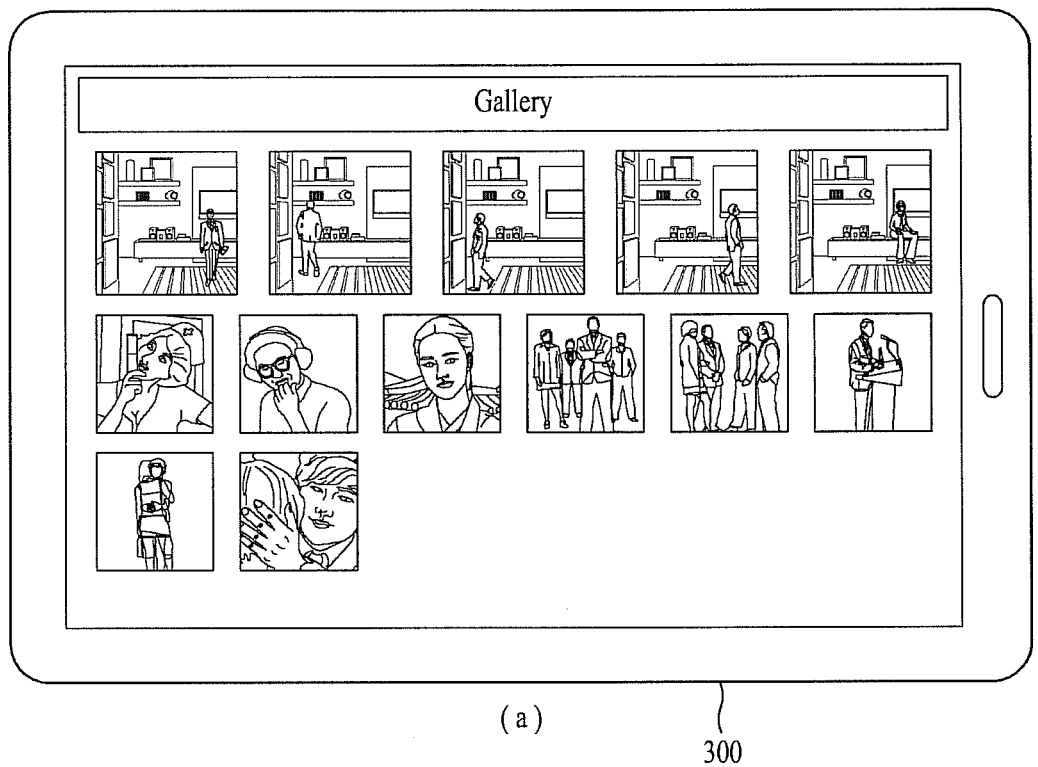
(a)
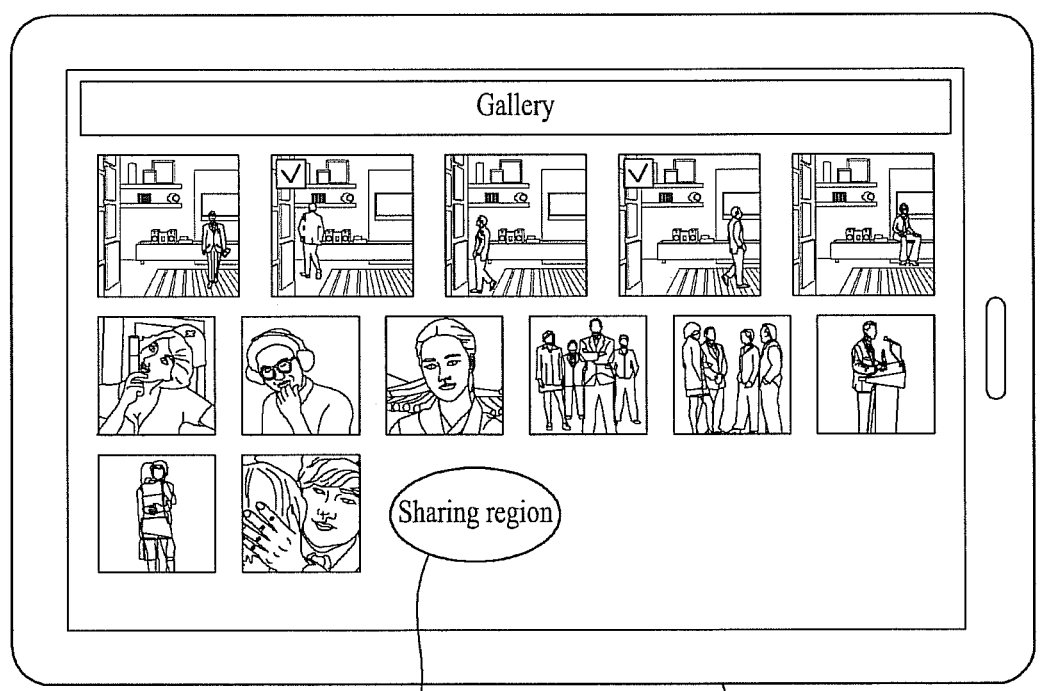
(b)

MOBILE TERMINAL AND CONTROLLING METHOD THEREOF

CROSS-REFERENCE TO RELATED PATENT APPLICATIONS

Pursuant to 35 U.S.C. §119(a) and (e), this application claims the benefit of earlier filing date and right of priority to Korean Application No. 10-2013-0048327, filed on Apr. 30, 2013 and U.S. Application No. 61/816,701 filed on Apr. 27, 2013, the contents of which are hereby incorporated by reference herein in their entireties.

BACKGROUND OF THE INVENTION

Field of the Invention

The present invention relates to a mobile terminal, and more particularly, to a mobile terminal and controlling method thereof. Although the present invention is suitable for a wide scope of applications, it is particularly suitable for facilitating a content sharing between a mobile terminal and a call counterpart in the course of making a phone call in-between.

Discussion of the Related Art

A mobile terminal is a device which may be configured to perform various functions. Examples of such functions include data and voice communications, capturing images and video via a camera, recording audio, playing music files and outputting music via a speaker system, and displaying images and video on a display.

Generally, terminals can be classified into mobile terminals and stationary terminals according to a presence or non-presence of mobility. And, the mobile terminals can be further classified into handheld terminals and vehicle mount terminals according to availability for hand-carry.

There are ongoing efforts to support and increase the functionality of mobile terminals. Such efforts include software and hardware improvements, as well as changes and improvements in the structural components which form the mobile terminal.

Unless using a separate device such as an earphone and the like, in case that a user of a mobile terminal in the course of making a phone call intends to share data with a call counterpart, the user has to detach the mobile terminal from user's ear to apply a user input for the data sharing to the mobile terminal. Likewise, if a data sharing is requested from the call counterpart, the user may have to detach the mobile terminal from the user's ear to check a shared data. Thus, if data is shared with a call counterpart in the course of making a phone call, it is unable to guarantee the continuity of the phone call.

Moreover, if a mobile terminal is detached from a user's ear, the mobile terminal is forced to enter a speakerphone mode in order to listen to a call substance. Hence, it is difficult to share data with a call counterpart in such a place not suitable for utilizing the speakerphone mode appropriately as a public place, a loud place and the like.

Furthermore, since a plurality of user inputs (e.g., activating a sharing function, displaying a list of sharable users, designating a call counterpart in a sharable user list, etc.) are forced to be applied in order to share data with a call counterpart, it is inconvenient to designate the call counterpart as a data sharing target.

SUMMARY OF THE INVENTION

Accordingly, embodiments of the present invention are directed to a mobile terminal and controlling method thereof that substantially obviate one or more problems due to limitations and disadvantages of the related art.

An object of the present invention is to provide a mobile terminal and controlling method thereof, by which user's convenience can be enhanced.

In particular, one object of the present invention is to provide a mobile terminal and controlling method thereof, by which a sharing target can be determined easily and conveniently without a plurality of user inputs in a manner of specifying a call counterpart as the sharing target.

Another object of the present invention is to provide a mobile terminal and controlling method thereof, by which data can be shared with a call counterpart easily and conveniently through an external terminal device.

Further object of the present invention is to provide a mobile terminal and controlling method thereof, by which a shared content can be checked easily and conveniently through an external terminal device.

Additional advantages, objects, and features of the invention will be set forth in the disclosure herein as well as the accompanying drawings. Such aspects may also be appreciated by those skilled in the art based on the disclosure herein.

To achieve these objects and other advantages and in accordance with the purpose of the invention, as embodied and broadly described herein, a mobile terminal according to one embodiment of the present invention may include a wireless communication unit configured to perform a communication with an external terminal device while the external terminal is currently in a phone call with a call counterpart, a touchscreen configured to display a content list of contents to share with the call counterpart, and a controller to control the touchscreen, wherein in response to receiving a user input to request a sharing of at least one content in the content list, the controller to control a request, to the external terminal device, to share the sharing requested content with the call counterpart.

In another aspect of the present invention, as embodied and broadly described herein, a method of controlling a mobile terminal according to another embodiment of the present invention may include the steps of establishing a communication channel with an external terminal device while the external terminal is currently in a phone call with a call counterpart, displaying a content list of contents to share with the call counterpart, and in response to receiving a user input to request a sharing of at least one content in the content list, providing a request, to the external terminal device, to share the sharing requested content with the call counterpart.

In another aspect of the present invention, as embodied and broadly described herein, a mobile terminal according to another embodiment of the present invention may include a displaying unit configured to display information, a wireless communication unit configured to provide a phone call connection with a call counterpart, the wireless communication unit configured to communicate with an external terminal device, and a controller to control display of the displaying unit, wherein in response to receiving a request to share at least one content from the external terminal device, controlling the sharing requested content to be provided to the call counterpart.

In further aspect of the present invention, as embodied and broadly described herein, a method of controlling a mobile terminal according to further embodiment of the present invention may include the steps of establishing a communication channel with an external terminal device, and in response to receiving a request for sharing at least one content from the external terminal device during a phone call with a call counterpart, sending the sharing requested content to the call counterpart.

Effects obtainable from the present invention may be non-limited by the above mentioned effect. And, other unmentioned effects can be clearly understood from the following description by those having ordinary skill in the technical field to which the present invention pertains.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. The above and other aspects, features, and advantages of the present invention will become more apparent upon consideration of the following description of preferred embodiments, taken in conjunction with the accompanying drawing figures. In the drawings:

FIG. 5 is a diagram for one example to describe a process for a first mobile terminal and a second mobile terminal to be paired with each other through Bluetooth;

FIG. 6 is a flowchart for an operation of a second mobile terminal according to one embodiment of the present invention;

FIGS. 7A to 7C show screen output changes of a second mobile terminal when a spaced distance from a first mobile terminal with which a phone call is currently made is determined as equal to or smaller than a preset distance;

FIG. 12 is a diagram for one example to describe an example of a user input;

DETAILED DESCRIPTION OF THE INVENTION

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

As used herein, the suffixes 'module', 'unit' and 'part' are used for elements in order to facilitate the disclosure only. Therefore, significant meanings or roles are not given to the suffixes themselves and it is understood that the 'module', 'unit' and 'part' can be used together or interchangeably.

The present invention can be applicable to a various types of mobile terminals. Examples of such terminals include mobile phones, user equipments, smart phones, digital broadcast receivers, personal digital assistants, laptop computers, portable multimedia players (PMP), navigators and the like.

Yet, it is apparent to those skilled in the art that a configuration according to an embodiment disclosed in this specification is applicable to such a fixed terminal as a digital TV, a desktop computer and the like as well as a mobile terminal.

Figure 1:
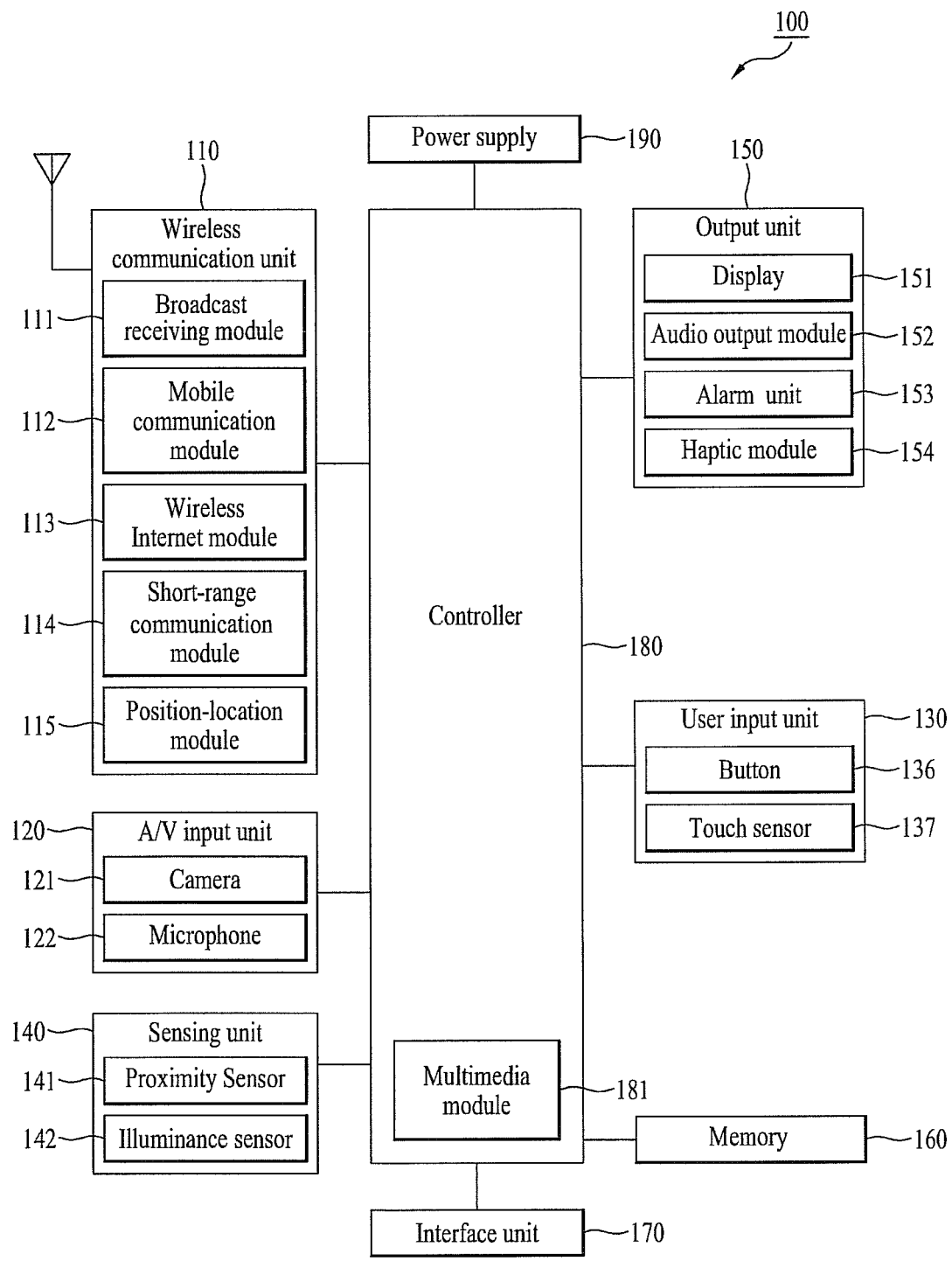
FIG. 1 is a block diagram of a mobile terminal according to one embodiment of the present invention.

FIG. 1 is a block diagram of a mobile terminal 100 in accordance with an embodiment of the present invention. FIG. 1 shows the mobile terminal 100 according to one embodiment of the present invention includes a wireless communication unit 110, an A/V (audio/video) input unit 120, a user input unit 130, a sensing unit 140, an output unit 150, a memory 160, an interface unit 170, a controller 180, a power supply unit 190 and the like. FIG. 1 shows the mobile terminal 100 having various components, but it is understood that implementing all of the illustrated components is not a requirement. Greater or fewer components may alternatively be implemented.

In the following description, the above elements of the mobile terminal 100 are explained in sequence.

First of all, the wireless communication unit 110 typically includes one or more components which permits wireless communication between the mobile terminal 100 and a wireless communication system or network within which the mobile terminal 100 is located. For instance, the wireless communication unit 110 can include a broadcast receiving module 111, a mobile communication module 112, a wireless internet module 113, a short-range communication module 114, a position-location module 115 and the like.

The broadcast receiving module 111 receives a broadcast signal and/or broadcast associated information from an external broadcast managing server via a broadcast channel. The broadcast channel may include a satellite channel and a terrestrial channel. At least two broadcast receiving modules 111 can be provided to the mobile terminal 100 in pursuit of simultaneous receptions of at least two broadcast channels or broadcast channel switching facilitation.

The broadcast managing server generally refers to a server which generates and transmits a broadcast signal and/or broadcast associated information or a server which is provided with a previously generated broadcast signal and/or broadcast associated information and then transmits the provided signal or information to a terminal. The broadcast signal may be implemented as a TV broadcast signal, a radio broadcast signal, and a data broadcast signal, among others. If desired, the broadcast signal may further include a broadcast signal combined with a TV or radio broadcast signal.

The broadcast associated information includes information associated with a broadcast channel, a broadcast program, a broadcast service provider, etc. And, the broadcast associated information can be provided via a mobile communication network. In this case, the broadcast associated information can be received by the mobile communication module 112.

The broadcast associated information can be implemented in various forms. For instance, broadcast associated information may include an electronic program guide (EPG) of digital multimedia broadcasting (DMB) and electronic service guide (ESG) of digital video broadcast-handheld (DVB-H).

The broadcast receiving module 111 may be configured to receive broadcast signals transmitted from various types of broadcast systems. By nonlimiting example, such broadcasting systems include digital multimedia broadcasting-terrestrial (DMB-T), digital multimedia broadcasting-satellite (DMB-S), digital video broadcast-handheld (DVB-H), Convergence of Broadcasting and Mobile Service (DVB-CBMS), Open Mobile Alliance-BroadCAST (OMA-BCAST), China Multimedia Mobile Broadcasting (CMMB), Mobile Broadcasting Business Management System (MBBMS), the data broadcasting system known as media forward link only (MediaFLO®) and integrated services digital broadcast-terrestrial (ISDB-T). Optionally, the broadcast receiving module 111 can be configured suitable for other broadcasting systems as well as the above-explained digital broadcasting systems.

The broadcast signal and/or broadcast associated information received by the broadcast receiving module 111 may be stored in a suitable device, such as a memory 160.

The mobile communication module 112 transmits/receives wireless signals to/from one or more network entities (e.g., base station, external terminal, server, etc.) via a mobile network such as GSM (Global System for Mobile communications), CDMA (Code Division Multiple Access), WCDMA (Wideband CDMA) and so on. Such wireless signals may represent audio, video, and data according to text/multimedia message transceivings, among others.

The wireless internet module 113 supports Internet access for the mobile terminal 100. This module may be internally or externally coupled to the mobile terminal 100. In this case, the wireless Internet technology can include WLAN (Wireless LAN) (Wi-Fi), Wibro (Wireless broadband), Wimax (World Interoperability for Microwave Access), HSDPA (High Speed Downlink Packet Access), GSM, CDMA, WCDMA, LTE (Long Term Evolution) etc.

Wireless internet access by Wibro, HSPDA, GSM, CDMA, WCDMA, LTE or the like is achieved via a mobile communication network. In this aspect, the wireless internet module 113 configured to perform the wireless internet access via the mobile communication network can be understood as a sort of the mobile communication module 112.

The short-range communication module 114 facilitates relatively short-range communications. Suitable technologies for implementing this module include radio frequency identification (RFID), infrared data association (IrDA), ultra-wideband (UWB), as well at the networking technologies commonly referred to as Bluetooth and ZigBee, to name a few.

The position-location module 115 identifies or otherwise obtains the location of the mobile terminal 100. If desired, this module may be implemented with a global positioning system (GPS) module. According to the current technology, the GPS module 115 is able to precisely calculate current 3-dimensional position information based on at least one of longitude, latitude and altitude and direction (or orientation) by calculating distance information and precise time information from at least three satellites and then applying triangulation to the calculated information. Currently, location and time informations are calculated using three satellites, and errors of the calculated location position and time informations are then amended using another satellite. Besides, the GPS module 115 is able to calculate speed information by continuously calculating a real-time current location.

Referring to FIG. 1, the audio/video (A/V) input unit 120 is configured to provide audio or video signal input to the mobile terminal 100. As shown, the A/V input unit 120 includes a camera 121 and a microphone 122. The camera 121 receives and processes image frames of still pictures or video, which are obtained by an image sensor in a video call mode or a photographing mode. And, the processed image frames can be displayed on the display 151.

The image frames processed by the camera 121 can be stored in the memory 160 or can be externally transmitted via the wireless communication unit 110. Optionally, at least two cameras 121 can be provided to the mobile terminal 100 according to environment of usage.

The microphone 122 receives an external audio signal while the portable device is in a particular mode, such as phone call mode, recording mode and voice recognition. This audio signal is processed and converted into electric audio data. The processed audio data is transformed into a format transmittable to a mobile communication base station via the mobile communication module 112 in case of a call mode. The microphone 122 typically includes assorted noise removing algorithms to remove noise generated in the course of receiving the external audio signal.

The user input unit 130 generates input data responsive to user manipulation of an associated input device or devices. Examples of such devices include a button 136 provided to front/rear/lateral side of the mobile terminal 100 and a touch sensor (constant pressure/electrostatic) 137 and may further include a key pad, a dome switch, a jog wheel, a jog switch and the like [not shown in the drawing].

The sensing unit 140 provides sensing signals for controlling operations of the mobile terminal 100 using status measurements of various aspects of the mobile terminal. For instance, the sensing unit 140 may detect an open/close status of the mobile terminal 100, relative positioning of components (e.g., a display and keypad) of the mobile terminal 100, a change of position of the mobile terminal 100 or a component of the mobile terminal 100, a presence or absence of user contact with the mobile terminal 100, orientation or acceleration/deceleration of the mobile terminal 100. By nonlimiting example, such sensing unit 140 include, gyro sensor, accelerate sensor, geomagnetic sensor.

As an example, consider the mobile terminal 100 being configured as a slide-type mobile terminal. In this configuration, the sensing unit 140 may sense whether a sliding portion of the mobile terminal is open or closed. Other examples include the sensing unit 140 sensing the presence or absence of power provided by the power supply 190, the presence or absence of a coupling or other connection between the interface unit 170 and an external device. And, the sensing unit 140 can include a proximity sensor 141.

The output unit 150 generates outputs relevant to the senses of sight, hearing, touch and the like. And, the output unit 150 includes the display 151, an audio output module 152, an alarm unit 153, and a haptic module 154 and the like.

The display 151 is typically implemented to visually display (output) information associated with the mobile terminal 100. For instance, if the mobile terminal is operating in a phone call mode, the display will generally provide a user interface (UI) or graphical user interface (GUI) which includes information associated with placing, conducting, and terminating a phone call. As another example, if the mobile terminal 100 is in a video call mode or a photographing mode, the display 151 may additionally or alternatively display images which are associated with these modes, the UI or the GUI.

The display module 151 may be implemented using known display technologies including, for example, a liquid crystal display (LCD), a thin film transistor-liquid crystal display (TFT-LCD), an organic light-emitting diode display (OLED), a flexible display and a three-dimensional display. The mobile terminal 100 may include one or more of such displays.

Some of the above displays can be implemented in a transparent or optical transmittive type, which can be named a transparent display. As a representative example for the transparent display, there is TOLED (transparent OLED) or the like. A rear configuration of the display 151 can be implemented in the optical transmittive type as well. In this configuration, a user is able to see an object in rear of a terminal body via the area occupied by the display 151 of the terminal body.

At least two displays 151 can be provided to the mobile terminal 100 in accordance with the implemented configuration of the mobile terminal 100. For instance, a plurality of displays can be arranged on a single face of the mobile terminal 100 in a manner of being spaced apart from each other or being built in one body. Alternatively, a plurality of displays can be arranged on different faces of the mobile terminal 100.

In case that the display 151 and the touch sensor 137 configures a mutual layer structure (hereinafter called 'touch screen'), it is able to use the display 151 as an input device as well as an output device. In this case, the touch sensor can be configured as a touch film, a touch sheet, a touchpad or the like.

The touch sensor 137 can be configured to convert a pressure applied to a specific portion of the display 151 or a variation of a capacitance generated from a specific portion of the display 151 to an electric input signal. Moreover, it is able to configure the touch sensor 137 to detect a pressure of a touch as well as a touched position or size.

If a touch input is made to the touch sensor 137, signal(s) corresponding to the touch is transferred to a touch controller. The touch controller processes the signal(s) and then transfers the processed signal(s) to the controller 180. Therefore, the controller 180 is able to know whether a prescribed portion of the display 151 is touched.

Figure 2:
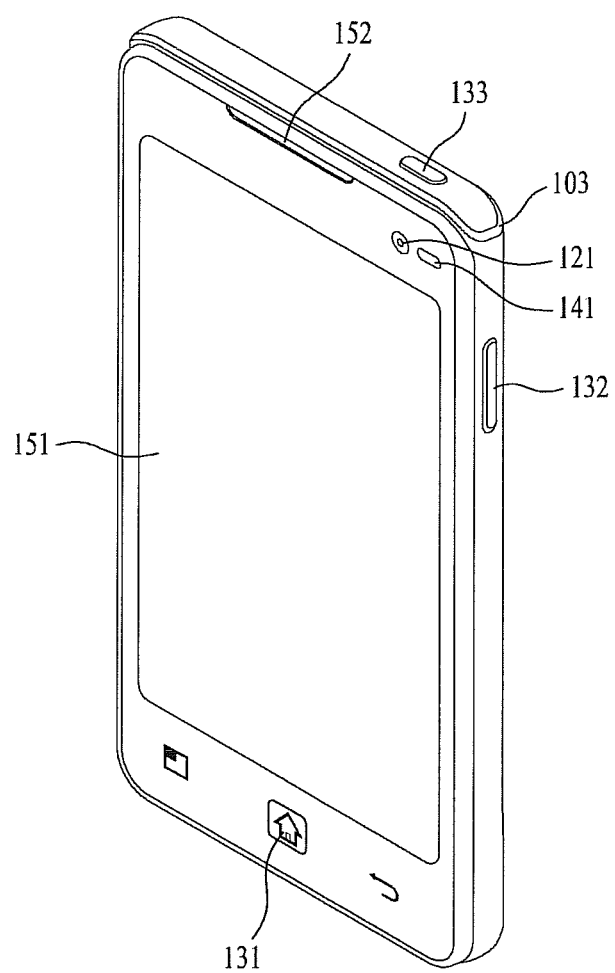
FIG. 2 is a front perspective diagram of a mobile terminal according to one embodiment of the present invention.

Referring to FIG. 2, a proximity sensor (141) can be provided to an internal area of the mobile terminal 100 enclosed by the touchscreen or around the touchscreen. The proximity sensor is the sensor that detects a presence or non-presence of an object approaching a prescribed detecting surface or an object existing around the proximity sensor using an electromagnetic field strength or infrared ray without mechanical contact. Hence, the proximity sensor has durability longer than that of a contact type sensor and also has utility wider than that of the contact type sensor.

The proximity sensor can include one of a transmittive photoelectric sensor, a direct reflective photoelectric sensor, a mirror reflective photoelectric sensor, a radio frequency oscillation proximity sensor, an electrostatic capacity proximity sensor, a magnetic proximity sensor, an infrared proximity sensor and the like. In case that the touchscreen includes the electrostatic capacity proximity sensor, it is configured to detect the proximity of a pointer using a variation of electric field according to the proximity of the pointer. In this case, the touchscreen (touch sensor) can be classified as the proximity sensor.

For clarity and convenience of the following description, as a pointer becomes proximate to a touchscreen without coming into contact with the touchscreen, if the pointer is perceived as situated over the touchscreen, such an action shall be named 'proximity touch'. If a pointer actually comes into contact with a touchscreen, such an action shall be named 'contact touch'. A proximity-touched position over the touchscreen with the pointer may mean a position at which the pointer vertically opposes the touchscreen when the touchscreen is proximity-touched with the pointer.

The proximity sensor detects a proximity touch and a proximity touch pattern (e.g., a proximity touch distance, a proximity touch duration, a proximity touch position, a proximity touch shift state, etc.). And, information corresponding to the detected proximity touch action and the detected proximity touch pattern can be outputted to the touchscreen.

The audio output module 152 functions in various modes including a call-receiving mode, a call-placing mode, a recording mode, a voice recognition mode, a broadcast reception mode and the like to output audio data which is received from the wireless communication unit 110 or is stored in the memory 160. During operation, the audio output module 152 outputs audio relating to a particular function (e.g., call received, message received, etc.). The audio output module 152 is often implemented using one or more speakers, buzzers, other audio producing devices, and combinations thereof.

The alarm unit 153 is output a signal for announcing the occurrence of a particular event associated with the mobile terminal 100. Typical events include a call received event, a message received event and a touch input received event. The alarm unit 153 is able to output a signal for announcing the event occurrence by way of vibration as well as video or audio signal. The video or audio signal can be outputted via the display 151 or the audio output unit 152. Hence, the display 151 or the audio output module 152 can be regarded as a part of the alarm unit 153.

The haptic module 154 generates various tactile effects that can be sensed by a user. Vibration is a representative one of the tactile effects generated by the haptic module 154. Strength and pattern of the vibration generated by the haptic module 154 are controllable. For instance, different vibrations can be outputted in a manner of being synthesized together or can be outputted in sequence.

The haptic module 154 is able to generate various tactile effects as well as the vibration. For instance, the haptic module 154 generates the effect attributed to the arrangement of pins vertically moving against a contact skin surface, the effect attributed to the injection/suction power of air though an injection/suction hole, the effect attributed to the skim over a skin surface, the effect attributed to the contact with electrode, the effect attributed to the electrostatic force, the effect attributed to the representation of hold/cold sense using an endothermic or exothermic device and the like.

The haptic module 154 can be implemented to enable a user to sense the tactile effect through a muscle sense of finger, arm or the like as well as to transfer the tactile effect through a direct contact. Optionally, at least two haptic modules 154 can be provided to the mobile terminal 100 in accordance with the corresponding configuration type of the mobile terminal 100.

The memory unit 160 is generally used to store various types of data to support the processing, control, and storage requirements of the mobile terminal 100. Examples of such data include program instructions for applications operating on the mobile terminal 100, contact data, phonebook data, messages, audio, still pictures (or photo), moving pictures, etc. And, a recent use history or a cumulative use frequency of each data (e.g., use frequency for each phonebook, each message or each multimedia) can be stored in the memory unit 160. Moreover, data for various patterns of vibration and/or sound outputted in case of a touch input to the touchscreen can be stored in the memory unit 160.

The memory 160 may be implemented using any type or combination of suitable volatile and non-volatile memory or storage devices including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory (e.g., SD memory, XD memory, etc.), or other similar memory or data storage device. And, the mobile terminal 100 is able to operate in association with a web storage for performing a storage function of the memory 160 on Internet.

The interface unit 170 is often implemented to couple the mobile terminal 100 with external devices. The interface unit 170 receives data from the external devices or is supplied with the power and then transfers the data or power to the respective elements of the mobile terminal 100 or enables data within the mobile terminal 100 to be transferred to the external devices. The interface unit 170 may be configured using a wired/wireless headset port, an external charger port, a wired/wireless data port, a memory card port, a port for coupling to a device having an identity module, audio input/output ports, video input/output ports, an earphone port and/or the like.

The identity module is the chip for storing various kinds of information for authenticating a use authority of the mobile terminal 100 and can include User Identify Module (UIM), Subscriber Identify Module (SIM), Universal Subscriber Identity Module (USIM) and/or the like. A device having the identity module (hereinafter called 'identity device') can be manufactured as a smart card. Therefore, the identity device is connectible to the mobile terminal 100 via the corresponding port.

When the mobile terminal 110 is connected to an external cradle, the interface unit 170 becomes a passage for supplying the mobile terminal 100 with a power from the cradle or a passage for delivering various command signals inputted from the cradle by a user to the mobile terminal 100. Each of the various command signals inputted from the cradle or the power can operate as a signal enabling the mobile terminal 100 to recognize that it is correctly loaded in the cradle.

The controller 180 typically controls the overall operations of the mobile terminal 100. For example, the controller 180 performs the control and processing associated with voice calls, data communications, video calls, etc. The controller 180 may include a multimedia module 181 that provides multimedia playback. The multimedia module 181 may be configured as part of the controller 180, or implemented as a separate component.

Moreover, the controller 180 is able to perform a pattern (or image) recognizing process for recognizing a writing input and a picture drawing input carried out on the touchscreen as characters or images, respectively.

The power supply unit 190 provides power required by the various components for the mobile terminal 100. The power may be internal power, external power, or combinations thereof.

A battery may include a built-in rechargeable battery and may be detachably attached to the terminal body for a charging and the like. A connecting port may be configured as one example of the interface 170 via which an external charger for supplying a power of a battery charging is electrically connected.

Various embodiments described herein may be implemented in a computer-readable medium using, for example, computer software, hardware, or some combination thereof.

For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such embodiments may also be implemented by the controller 180.

For a software implementation, the embodiments described herein may be implemented with separate software modules, such as procedures and functions, each of which perform one or more of the functions and operations described herein. The software codes can be implemented with a software application written in any suitable programming language and may be stored in memory such as the memory 160, and executed by a controller or processor, such as the controller 180.

FIG. 2 is a front perspective diagram of a mobile terminal according to one embodiment of the present invention.

The mobile terminal 100 shown in the drawing has a bar type terminal body. Yet, the mobile terminal 100 may be implemented in a variety of different configurations. Examples of such configurations include folder-type, slide-type, rotational-type, swing-type and combinations thereof. For clarity, further disclosure will primarily relate to a bar-type mobile terminal 100. However such teachings apply equally to other types of mobile terminals.

Referring to FIG. 2A, the mobile terminal 100 includes a case (101, 102, 103) configuring an exterior thereof. In the present embodiment, the case can be divided into a front case 101 and a rear case 102. Various electric/electronic parts are loaded in a space provided between the front and rear cases 101 and 102.

Occasionally, electronic components can be mounted on a surface of the rear case 102. The electronic part mounted on the surface of the rear case 102 may include such a detachable part as a battery, a USIM card, a memory card and the like. In doing so, the rear case 102 may further include a backside cover 103 configured to cover the surface of the rear case 102. In particular, the backside cover 103 has a detachable configuration for user's convenience. If the backside cover 103 is detached from the rear case 102, the surface of the rear case 102 is exposed.

Referring to FIG. 2, if the backside cover 103 is attached to the rear case 102, a lateral side of the rear case 102 may be exposed in part. If a size of the backside cover 103 is decreased, a rear side of the rear case 102 may be exposed in part. If the backside cover 103 covers the whole rear side of the rear case 102, it may include an opening 103' configured to expose a camera 121' or an audio output unit 152' externally.

The cases 101, 102 and 103 are formed by injection molding of synthetic resin or can be formed of metal substance such as stainless steel (STS), titanium (Ti) or the like for example.

A display 151, an audio output unit 152, a camera 121, user input units 130/131 and 132, a microphone 122, an interface 180 and the like can be provided to the case 101 or 102.

The display 151 occupies most of a main face of the front case 101. The audio output unit 152 and the camera 121 are provided to an area adjacent to one of both end portions of the display 151, while the user input unit 131 and the microphone 122 are provided to another area adjacent to the other end portion of the display 151. The user input unit 132 and the interface 170 can be provided to lateral sides of the front and rear cases 101 and 102.

The input unit 130 is manipulated to receive a command for controlling an operation of the terminal 100. And, the input unit 130 is able to include a plurality of manipulating units 131 and 132. The manipulating units 131 and 132 can be named a manipulating portion and may adopt any mechanism of a tactile manner that enables a user to perform a manipulation action by experiencing a tactile feeling.

Content inputted by the first or second manipulating unit 131 or 132 can be diversely set. For instance, such a command as start, end, scroll and the like is inputted to the first manipulating unit 131. And, a command for a volume adjustment of sound outputted from the audio output unit 152 and the like can be inputted to the second manipulating unit 132, a command for a switching to a touch recognizing mode of the display 151 and the like can be inputted to the second manipulating unit 133.

Figure 3:
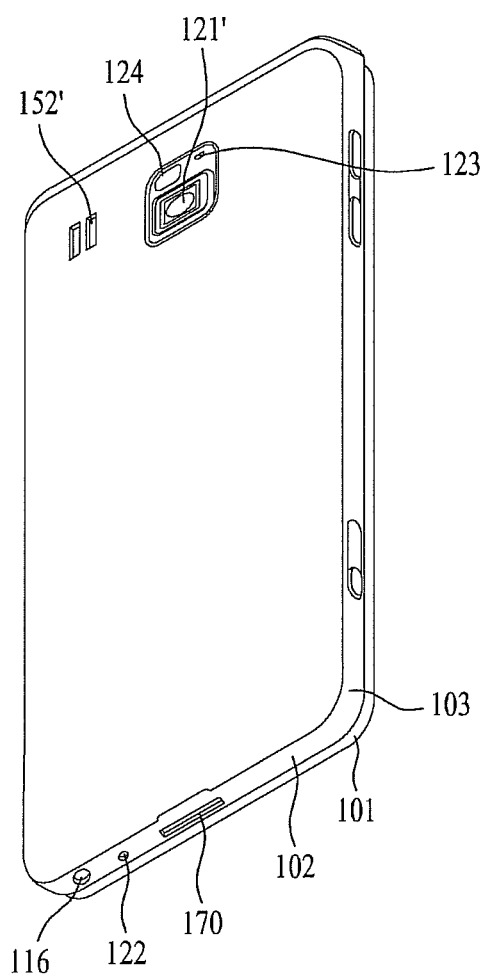
FIG. 3 is a rear perspective diagram of a mobile terminal according to one embodiment of the present invention.

FIG. 3 is a perspective diagram of a backside of the terminal shown in FIG. 2.

Referring to FIG. 3, a camera 121' can be additionally provided to a backside of the terminal body, and more particularly, to the rear case 102. The camera 121 has a photographing direction that is substantially opposite to that of the former camera 121 shown in FIG. 2 and may have pixels differing from those of the firmer camera 121.

Preferably, for instance, the former camera 121 has low pixels enough to capture and transmit a picture of user's face for a video call, while the latter camera 121' has high pixels for capturing a general subject for photography without transmitting the captured subject. And, each of the cameras 121 and 121' can be installed at the terminal body to be rotated or popped up.

A flash 123 and a mirror 124 are additionally provided adjacent to the camera 121'. The flash 123 projects light toward a subject in case of photographing the subject using the camera 121'. In case that a user attempts to take a picture of the user (self-photography) using the camera 121', the mirror 124 enables the user to view user's face reflected by the mirror 124.

An additional audio output unit 152' can be provided to the backside of the terminal body. The additional audio output unit 152' is able to implement a stereo function together with the former audio output unit 152 shown in FIG. 2 and may be used for implementation of a speakerphone mode in talking over the terminal.

A broadcast signal receiving antenna 116 can be additionally provided to the lateral side of the terminal body as well as an antenna for communication or the like. The antenna 116 constructing a portion of the broadcast receiving module 111 shown in FIG. 1 can be retractably provided to the terminal body.

The present invention is attributed to reciprocal actions of at least two mobile terminals 100. In particular, a communication channel can be established between the mobile terminals 100. While at least one mobile terminal 100 is making a phone call with a random counterpart, another mobile terminal 100 can output a list of contents to share with the call counterpart. In this case, the contents to be shared with the call counterpart may include data of various types including an image file, a video file, a music file, schedule data, memo data, a document file, a text and the like.

For clarity of the following description, one mobile terminal currently performing a phone call with a call counterpart shall be named a first mobile terminal and another mobile terminal currently outputting a list of contents to share with the call counterpart shall be named a second mobile terminal. For clarity of discrimination in the accompanying drawings, the first mobile terminal may be illustrated as a smartphone and the second mobile terminal may be illustrated as a tablet PC. Moreover, a reference number '200' may be assigned to the first mobile terminal, while a reference number '300' may be assigned to the second mobile terminal.

Each of the first mobile terminal 200 and the second mobile terminal 300 may include the wireless communication unit 110, the memory 160, the display unit 151 and the controller 180 among the components shown in FIG. 1. Moreover, at least one of the first mobile terminal 200 and the second mobile terminal 300 may further include at least one of the microphone 122, the sensing unit 140 and the audio output unit 152 among the components shown in FIG. 1. For clarity of the description of the following embodiments, 'first' may be attached in front of each of the components of the first mobile terminal 200 and 'second' may be attached in front of each of the components of the second mobile terminal 300.

If the display module or unit of each of the first mobile terminal 200 and the second mobile terminal 300 includes a touchscreen, implementation of the following embodiments may be further facilitated. Therefore, the following description is made on the assumption that the display module or unit of each of the first mobile terminal 200 and the second mobile terminal 300 may include the touchscreen.

For clarity of the following description, a person intending to use the first mobile terminal 200 and the second mobile terminal 300 according to the present invention may be named 'user', while a counterpart terminal making a phone call with the first mobile terminal 200 or a user of the counterpart terminal may be named 'call counterpart'.

Operations of the first mobile terminal 200 and the second mobile terminal 300 according to the present invention are described in detail as follows.

Figure 4:
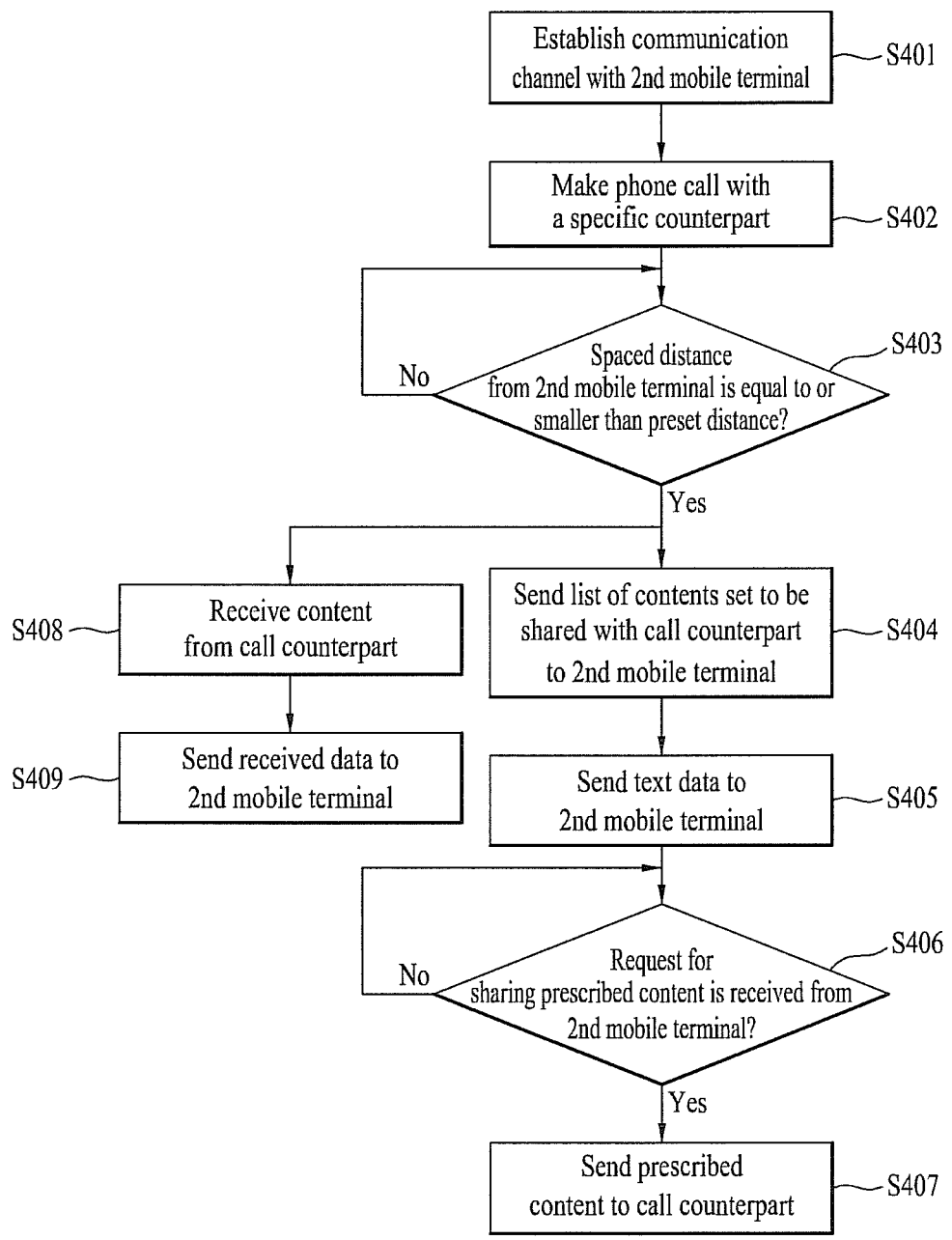
FIG. 4 is a flowchart for an operation of a first mobile terminal according to one embodiment of the present invention.

FIG. 4 is a flowchart for an operation of a first mobile terminal according to one embodiment of the present invention.

Referring to FIG. 4, a communication channel can be established between the first mobile terminal 200 and the second mobile terminal 300 [S401]. Short range communication technologies can be used for the establishment of the communication channel between the first mobile terminal 200 and the second mobile terminal 300. In particular, the short range communication technologies may include Bluetooth, Zigbee, IEEE 802.11x, Wi-Fi Direct and the like.

For instance, FIG. 5 is a diagram for one example to describe a process for a first mobile terminal and a second mobile terminal to be paired with each other through Bluetooth. Referring to FIG. 5, if the first mobile terminal 200 makes a request for a paring to the second mobile terminal 300 based on a user input, a second controller of the second mobile terminal 300 can control a popup window 510, which is provided to determines whether to accept the paring request from the first mobile terminal 200, to be displayed. In response to a user input to the popup window 510, the communication channel can be established between the first mobile terminal 200 and the second mobile terminal 300.

While the communication channel is established between the first mobile terminal 200 and the second mobile terminal 300, the first mobile terminal 200 can initiate a phone call with a specific counterpart [S402]. In this case, the phone call between the first mobile terminal 200 and the specific counterpart may include one of a voice call, a video call, a VoIP call and the like.

While the phone call with the specific counterpart is made, if a spaced distance between the first mobile terminal 200 and the second mobile terminal 300 becomes equal to or smaller than a preset distance [S403], the first controller can provide the second mobile terminal 300 with a list of contents to share with the call counterpart to the second mobile terminal 300 automatically or in response to a request made by the second mobile terminal 300 [S404]. In this case, the preset distance may be fixed to a specific value (e.g., 2 m) or designed to be modified by a user [e.g., modified into 3 m from 2 m]. The first controller can measure the spaced distance from the second mobile terminal 300 using such a sensor device as a proximity sensor, a distance sensor and the like. Alternatively, the first controller of the first mobile terminal 200 can measure the spaced distance from the second mobile terminal 300 based on a strength of a signal received from the second mobile terminal 300.

In case that a content to be shared with a counterpart is not a content saved in the first memory but a content saved in the second mobile terminal 300 or a content uploaded to a cloud server used in common by the first mobile terminal 200 or the second mobile terminal 300, it is able to skip the step of providing the content list to the second mobile terminal 300. On the other hand, if at least one portion of the content saved in the first memory pertains to the scope of the content to be shared with the counterpart, the first controller can provide the content list to the second mobile terminal 300.

In order to reduce the overhead of the communication between the first mobile terminal 200 and the second mobile terminal 300, the first controller can transmit a content list configured with thumbnails (or preview images) of the contents to share with the counterpart instead of transmitting the contents to share with the counterpart. If a request for transmitting at least one of the contents in the content list is received from the second mobile terminal 300, the first controller may be able to provide the second mobile terminal 300 with the at least one content requested by the second mobile terminal 300.

In providing the content list to the second mobile terminal 300, the first controller selects contents related to the call counterpart from a multitude of contents saved in the first memory and is then able to control a selected content list, which is configured with thumbnails (or preview images) of the selected contents, to be provided to the second mobile terminal 300. For instance, an image or video having the call counterpart taken therein, a schedule of the call counterpart, a memo of a name for identifying the call counterpart and the like may pertain to a scope of the contents related to the call counterpart.

The first controller may be able to further provide the second mobile terminal 200 with text data created from converting a speech signal generated in the course of the phone call to a text (Speech to Text, STT) [S405]. In doing so, the first controller can transmit both of a text converted on the basis of a speech uttered by the call counterpart and a text converted on the basis of a speech uttered by the user to the second mobile terminal 300. Alternatively, the first controller may provide either the text converted on the basis of a speech uttered by the call counterpart or the text converted on the basis of a speech uttered by the user to the second mobile terminal 300. Whether to provide both of the two texts or one of the two texts to the second mobile terminal 300 can be determined based on a setup value saved in the first memory. In this case, the setup value may be manually adjusted by the user.

Yet, the step of transmitting the text data to the second mobile terminal 300 is not a mandatory step. Occasionally, it may be able to skip the step of transmitting the text data to the second mobile terminal 300. Moreover, it is not necessary for the step of transmitting the text data to the second mobile terminal 300 to be performed after the step of providing the content list. For instance, the step of transmitting the text data to the second mobile terminal 300 may be performed ahead of or together with the step of providing the content list.

If a request for sharing a prescribed content with the call counterpart is received from the second mobile terminal 300 in the course of making the phone call [S406], the first controller transmits the content requested from the second mobile terminal 300 to the call counterpart and is then able to control the corresponding content to be shared with the call counterpart [S407].

In case of transmitting the content to share to the call counterpart in response to the request from the second mobile terminal 300, the content transmitted to the call counterpart can be outputted from the second mobile terminal 300 in order for both of the call counterpart and the user to obtain the same user experience (i.e., to appreciate or watch the same content). Since the content transmitted to the call counterpart is outputted not through the first mobile terminal 200 but through the second mobile terminal 300, the user can appreciate or watch the content shared with the call counterpart through the second mobile terminal 300 while continuing the phone call through the first mobile terminal 200.

If the content shared with the call counterpart is accompanied by an output of an audio signal such as a music, a video and the like, the first controller can adjust a volume of the content in order not to interrupt the phone call. For instance, if a level of an audio signal inputted to a first microphone exceeds a preset allowable value or equal to or greater than a prescribed level over a size of a speech in the course of a phone call, the first controller controls an output volume of the content to be automatically lowered by sending a control command for adjusting the output volume of the content to the second mobile terminal 300.

A content sharing may be requested to the call counterpart in response to a request from the second mobile terminal 300 to the first mobile terminal 200. On the contrary, a request for a content sharing may be received from the call counterpart. While the spaced distance from the second mobile terminal 300 is set equal to or smaller than the preset distance, if a content to be shared is received from the call counterpart [S408], the first controller can transmit the content received from the call counterpart to the second mobile terminal 300 [S409]. By controlling the received content to be outputted through the second mobile terminal 300, a user can check the received content without detaching the first mobile terminal 200 from the user's ear in order to check the first touchscreen.

While the spaced distance from the second mobile terminal 300 is greater than the preset distance, if a content to be shared is received from the second mobile terminal 300, the first controller may be able to output the shared content to the first touchscreen. Yet, after the content to be shared has been received from the second mobile terminal 300, if the spaced distance from the second mobile terminal 300 becomes equal to or smaller than the preset distance, the first controller may control the content received from the call counterpart to be transmitted to the second mobile terminal 300.

In the following description, operations of the second mobile terminal 300 are explained in detail.

FIG. 6 is a flowchart for an operation of a second mobile terminal according to one embodiment of the present invention.

Referring to FIG. 6, a communication channel can be established between the first mobile terminal 200 and the second mobile terminal 300 [S601]. While the communication channel is established between the first mobile terminal 200 and the second mobile terminal 300, if a spaced distance from the first mobile terminal 200 in the course of a phone call is determined as equal to or smaller than a preset distance [S602], the second controller specifies a call counterpart making the phone call with the first mobile terminal 200 as a content sharing target and is then able to display a list of contents to share with the call counterpart [S603].

Figure 7B:
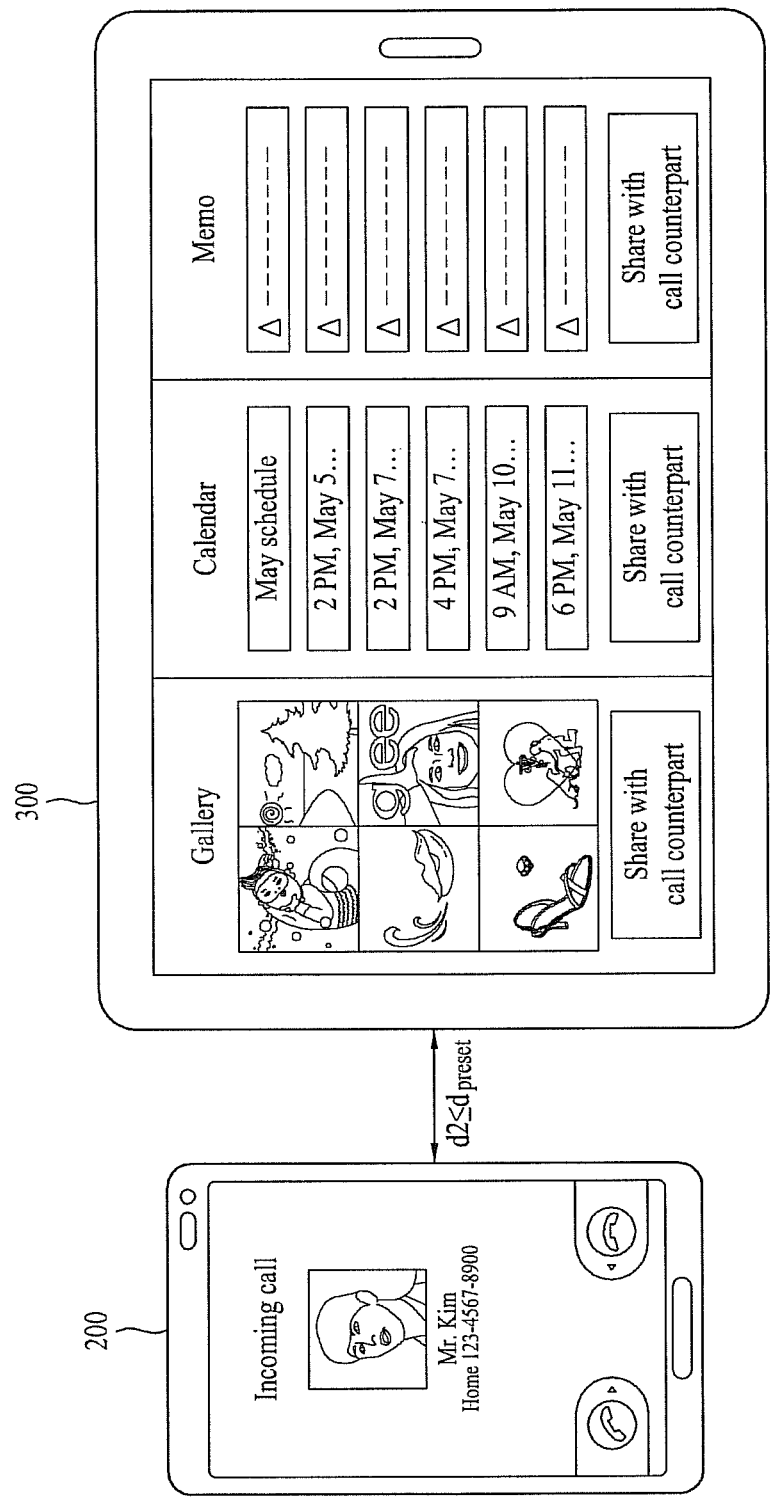

FIGS. 7A to 7C show screen output changes of a second mobile terminal when a spaced distance from a first mobile terminal with which a phone call is currently made is determined as equal to or smaller than a preset distance.

FIG. 7A shows one example of an output of the second mobile terminal 300 before the spaced distance from the first mobile terminal 200 becomes equal to or smaller than the preset distance. FIG. 7B shows one example of an output of the second mobile terminal 300 after the spaced distance from the first mobile terminal 200 has become equal to or smaller than the preset distance.

Referring to FIG. 7A and FIG. 7B, if the spaced distance from the first mobile terminal 200 becomes equal to or smaller than the preset distance, the second controller can control a list of contents to share with the call counterpart to be outputted through the second touchscreen. In FIG. 7B, types of the contents to be shared with the call counterpart include an image item, a schedule item and a memo item for example. Although the second controller may output the list of the contents of various types simultaneously, as shown in FIG. 7B, it may be able to output a list of contents of one of the various types only. For clarity of the drawings, assume that a list of contents of a prescribed type is displayed on the second touchscreen in the following drawings.

Before an output of the second mobile terminal 300 is changed [FIG. 7A or FIG. 7B], the second controller can control a popup window, which is provided to query whether to change the output of the second mobile terminal 300, to be outputted [FIG. 7C]. Based on a user input to the popup window shown in FIG. 7C, the second controller can determine whether to display a list of contents to share with the call counterpart.

The content list displayed on the second touchscreen may include at least one of a content saved in the first mobile terminal 200, a content saved in the second mobile terminal 300 and a content saved in a cloud server used in common by both of the first mobile terminal 200 and the second mobile terminal 300. In order to display the content list saved in the first mobile terminal 200 or the content list saved in the cloud server, the second mobile terminal 300 may receive the corresponding content list from the first mobile terminal 200 or the cloud server.

In displaying the content list, the second controller may control content(s) associated with the call counterpart to be disclosed in the content list. In this case, the contents associated with the call counterpart may include an image/video having the call counterpart taken therein, a schedule (e.g., schedule data of recording an appointment with the call counterpart) associated with the call counterpart, a memo (e.g., memo data of recording a name and/or phone number of the call counterpart, etc.) associated with the call counterpart and the like. After the contents related to the call counterpart have been extracted, in order to display a list of the extracted contents, the second controller can receive information on the call counterpart from the first mobile terminal 200 to disclose the contents only. In this case, the information on the call counterpart may include an image having the call counterpart taken therein, a title (e.g., a name, an SNS (social network service) account, etc.) for identifying the call counterpart, a phone number of the call counterpart and the like. Alternatively, in displaying the list of contents, the second controller extracts contents associated with the call counterpart and is then able to control the extracted contents to be displayed as a separate group. A method of displaying a list of contents associated with a call counterpart is described in detail with reference to FIG. 8 as follows.

Figure 8A:
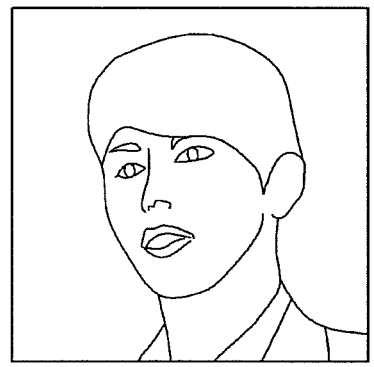
FIGS. 8A to 8C are diagrams for examples to describe a method of displaying a content associated with a call counterpart.
Figure 8B:
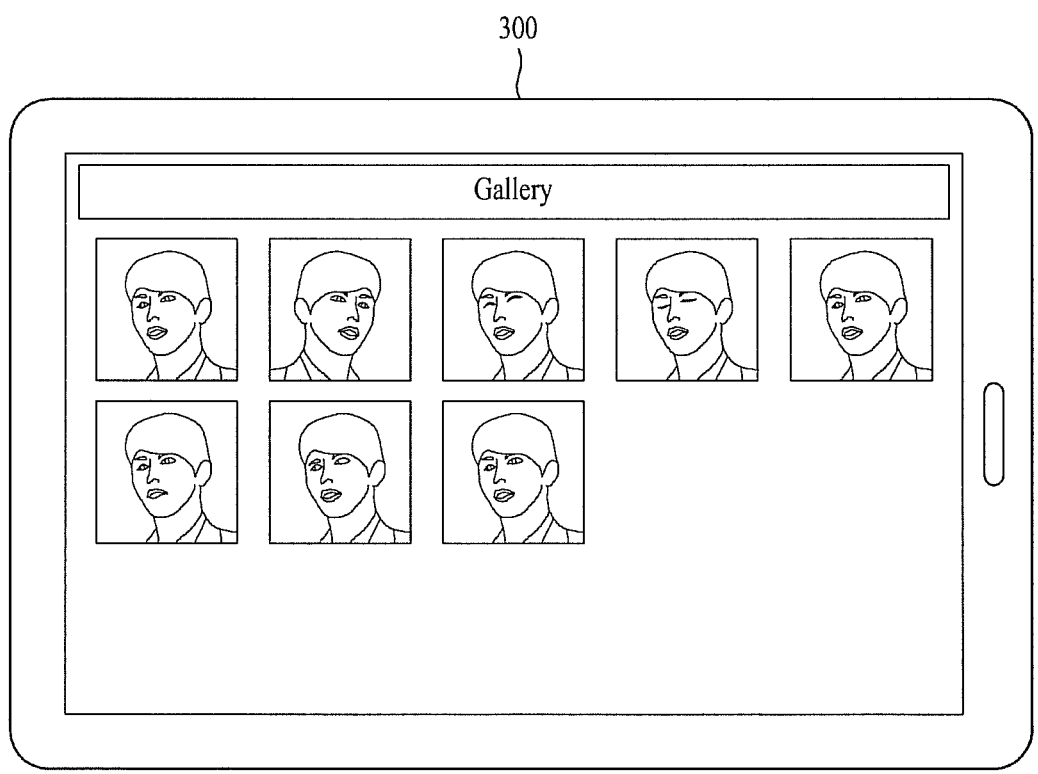
Figure 8C:
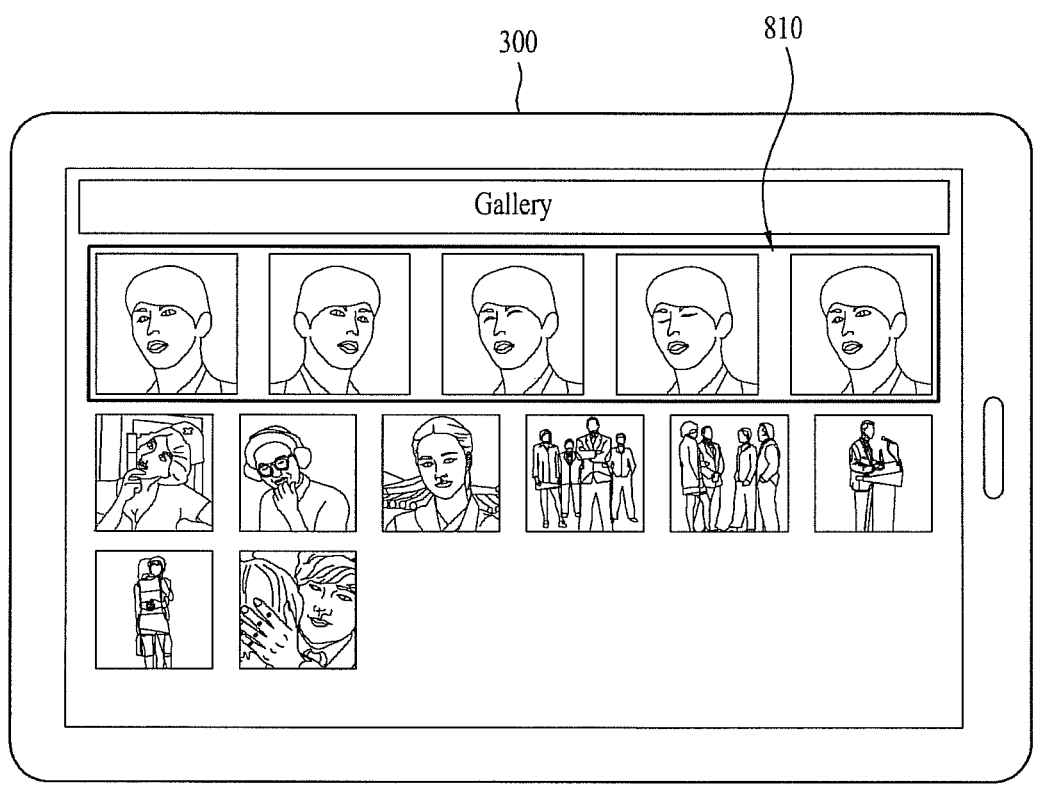

FIGS. 8A to 8C are diagrams for examples to describe a method of displaying a content associated with a call counterpart. For clarity of the following description, assume that an image to be shared with a call counterpart includes an image.

Referring to FIGS. 8A to 8C, a virtual shape of a call counterpart is shown in FIG. 8A. The second controller extracts images of the same character as the call counterpart shown in FIG. 8A and is then able to control a list of the images having the call counterpart taken therein to be displayed [FIG. 8B].

Alternatively, referring to FIG. 8C, while a list of contents is displayed, the second controller can control images having the call counterpart taken therein to be displayed as a separate group 810. According to the examples shown in FIGS. 8A to 8C, a user can recognize the contents associated with the call counterpart conveniently and easily.

Referring now to FIG. 6, the second mobile terminal 300 may receive text data from the first mobile terminal 200 currently making the phone call [S604]. In this case, text data results from converting an audio signal generated in the course of the phone call to a text and may include a data resulting from converting at least one of a speech uttered by the call counterpart and a speech uttered by the user to a text. The text data may be transmitted to the second mobile terminal 300 in response to a transmission request made by the second mobile terminal 300. Alternatively, the text data may be automatically transmitted to the second mobile terminal 300.

In order for the text data to be transmitted in response to the transmission request made by the second mobile terminal 300, the second controller may make a request for the first mobile terminal 200 to transmit at least one of the text data generated on the basis of the speech uttered by the user and the text data generated on the basis of the speech uttered by the call counterpart. Which one of the two text data will be requested can be adjusted depending on a setup value saved in the second memory. In this case, the setup value may be manually adjusted by the user.

The second controller may be able to display the text data received from the first mobile terminal 200 by real time. Yet, it is not mandatory for the second controller to display the text data received from the first mobile terminal 200. If the text data received from the first mobile terminal 200 is displayed, although the speech of the call counterpart is not correctly recognized, a message intended to be delivered by the call counterpart can be recognized through an output from the second touchscreen.

Figure 9:
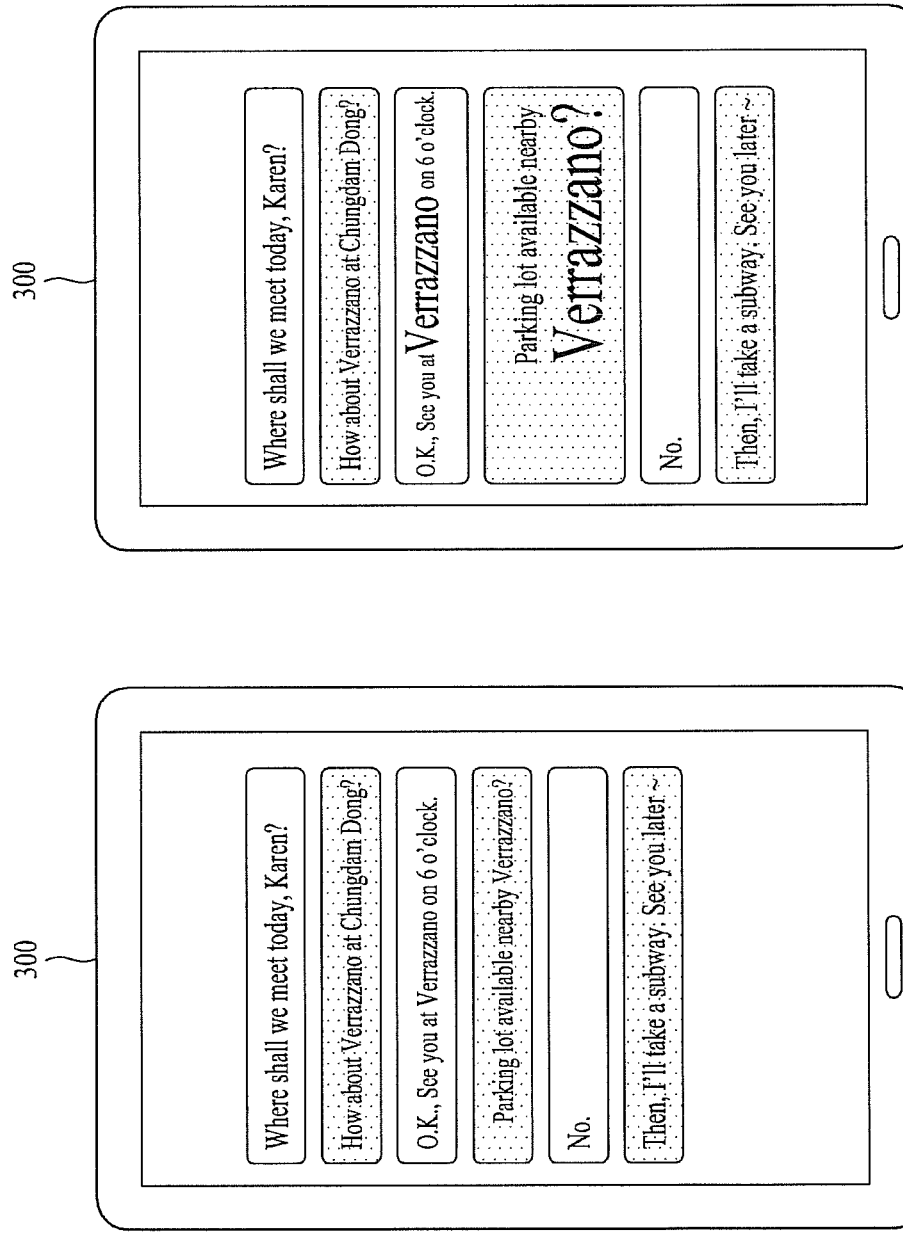
FIG. 9 is a diagram for one example of outputting text data through a second mobile terminal.

FIG. 9 is a diagram for one example of outputting text data through the second mobile terminal.

Referring to FIG. 9, the second controller can control text data, which has been received from the first mobile terminal 200, to be displayed [FIG. 9 (*a*)]. In doing so, if a specific word in a chat substance is repeated multiple times over a prescribed count, the second controller can control the specific word, which is repeated multiple times over the prescribed count, to be displayed in a manner of being emphasized [FIG. 9 (*b*)].

According to another embodiment of the present invention, the second controller analyzes text data and is then able to control information related to an analyzed chat substance to be displayed together with or in substitution for the text data.

Figure 10:
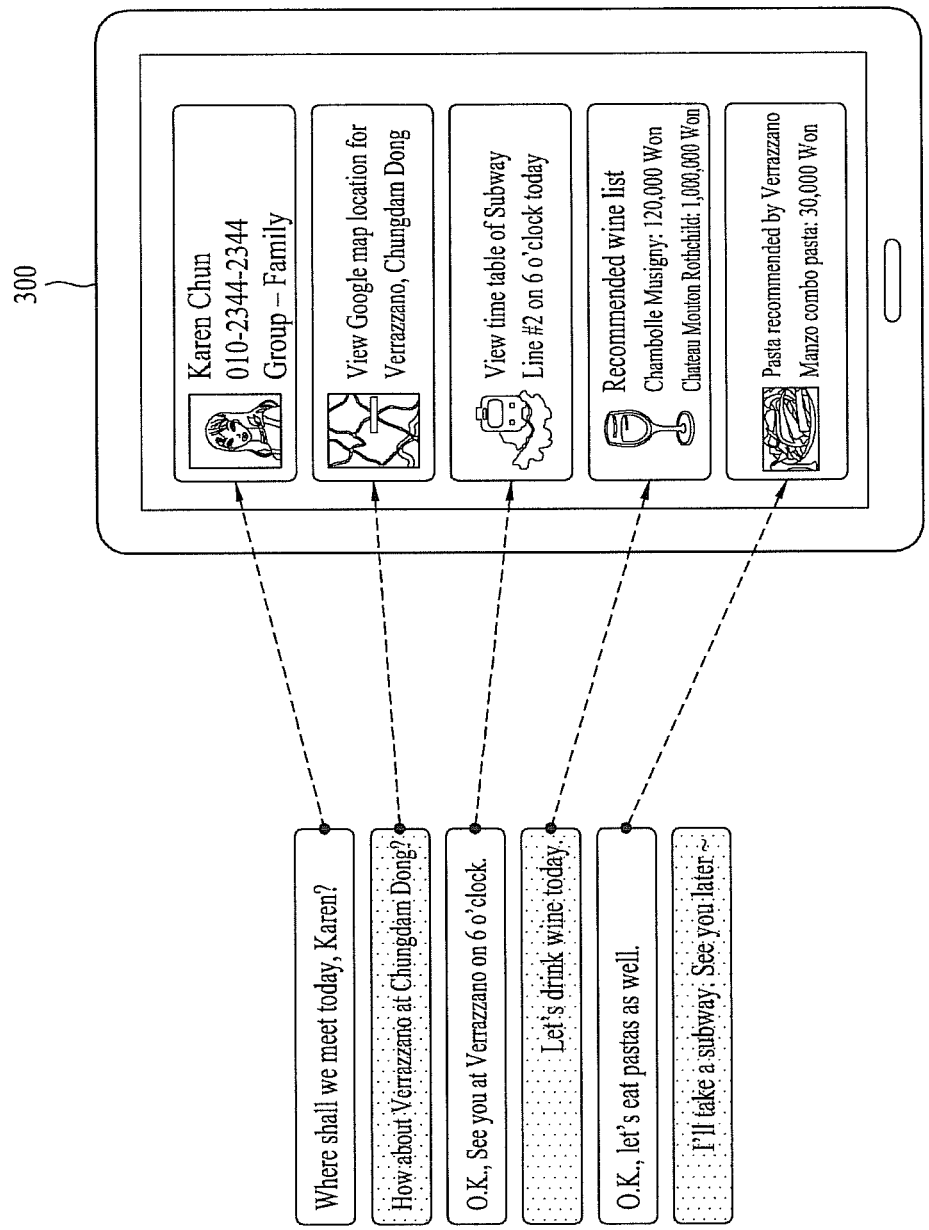
FIG. 10 is a diagram for one example of a process for displaying text data received from a first mobile terminal and information related to an analyzed chat substance.

For instance, FIG. 10 is a diagram for one example of a process for displaying text data received from the first mobile terminal and information related to an analyzed chat substance.

For instance, referring to FIG. 10, if a title for identifying a specific character (e.g., Karen in FIG. 10) is contained in an analyzed chat substance, the second controller can display information on the specific character, a phone number of the specific character, a group having the specific character belong thereto in a phonebook, and the like. For another instance, referring to FIG. 10, if a specific place (e.g., Chungdam Dong in FIG. 10) is contained in an analyzed chat substance, the second controller can display map data corresponding to the specific place. Besides, the second controller may display traffic information related to the chat substance, price information on a product related to the chat substance, and the like.

According to the present invention, the second controller controls either a list of contents to share with a call counterpart or text data to be displayed selectively or may control both of the content list and the text data to be displayed simultaneously. If both of the content list and the text data are set to be displayed simultaneously, the second controller partitions the second touchscreen into 2 regions including a first region and a second region, controls the list of the contents to share with the call counterpart to be displayed through the first region, and controls the text data to be displayed through the second region.

Referring now to FIG. 6, the second controller analyzes the text data received from the first mobile terminal 200, extracts contents associated with the chat substance from the contents to share with the call counterpart based on the analysis result of the text data, and is then able to display a list of the extracted contents [S605].

Figure 11:
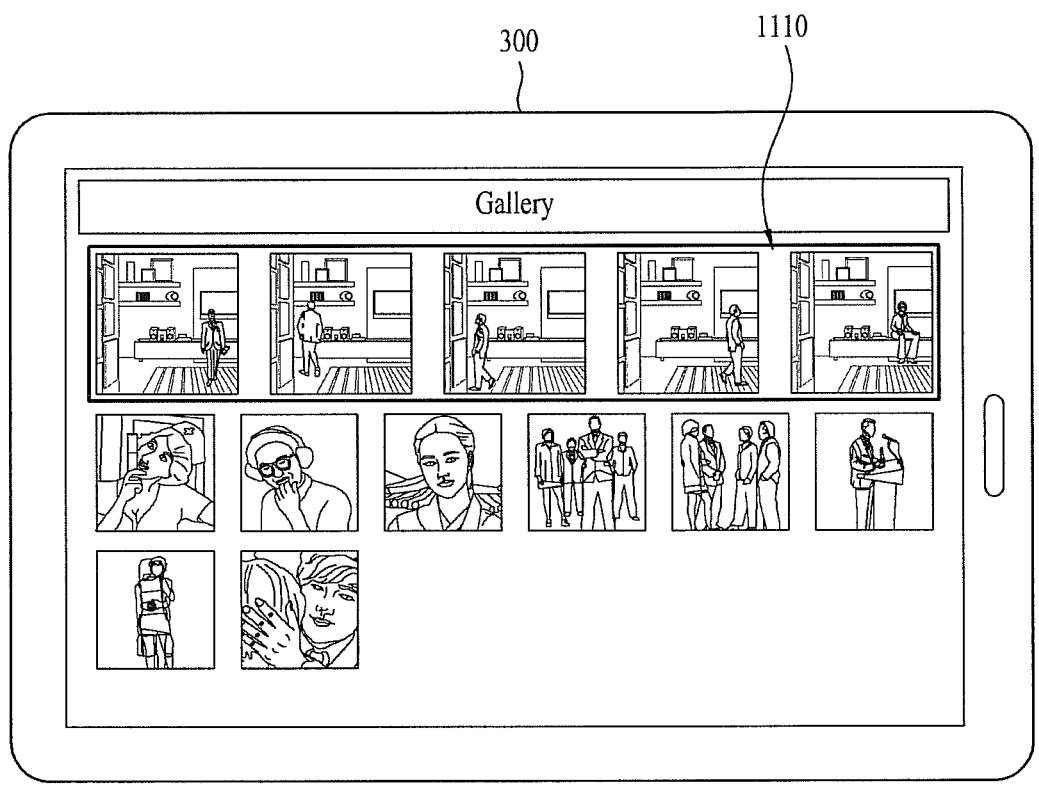
FIG. 11 is a diagram for one example to describe that contents associated with a chat substance are displayed as a separate group.

In displaying the content list, the second controller can display the list of the contents associated with the chat substance as a separate group. FIG. 11 is a diagram for one example to describe that contents associated with a chat substance are displayed as a separate group. FIG. 11 shows one example that a type of contents to be shared with a call counterpart is an image. For instance, if a specific place is contained in a chat substance as an analysis result of text data, referring to FIG. 11, the second controller extracts photos taken at the specific place from the contents to share with the call counterpart and is then able to display a list of the extracted images as a separate group 1110.

For instance, if the chat substance includes 'The weather was good when I went to Nam San.', the second controller extracts a geographical name 'Nam San' from the chat substance, extracts images taken at Nam San from a plurality of images, and is then able to display a list of the extracted images as a separate group.

For another instance, if a meaning corresponding to a specific time (e.g., a specific date, a specific weekday, etc.) is extracted from chat substance, the second controller extracts images taken in the specific time and is then able to display the extracted images as a separate group. For further instance, if a title (e.g., a name of a specific character, an SNS account of a specific character, etc.) for identifying the specific character is extracted from chat substance, the second controller extracts images having the specific character taken therein and is then able to display the extracted images as a separate group.

Unlike the example described with reference to FIG. 11, the second controller may control a list of contents associated with a chat substance to be displayed only. Alternatively, the second controller sorts the contents for the list by associations with the chat substance, controls the contents associated with the chat substance to be preferentially disclosed in the content list ahead of the rest of the contents not associated with the chat substance.

Although FIG. 11 shows one example that the type of the contents to be shared with the call counterpart is an image, the same principle shown in FIG. 11 can be applied to other types of contents as well as to the image. For instance, if the content to be shared with the call counterpart includes schedule data, the second controller extracts and displays a schedule which will be held in a place extracted from the chat substance or a schedule which will be held on a time extracted from the chat content.

While the content list is being displayed, if at least one content is selected from the content list and a user input for sharing the selected content with the call counterpart is applied [S606], the second controller can make a request for sharing the selected content with the call counterpart to the first mobile terminal 200 [S607].

In doing so, if the selected content is the one saved in the second mobile terminal 300, the 2nc controller may make the request for sharing the selected content with the call counterpart by sending the selected content to the first mobile terminal 200. On the other hand, if the selected content is the one saved in the first mobile terminal 200 or the cloud server used by the first mobile terminal 200 and the second mobile terminal 300, the second controller may be able to provide identification information of the selected content to the first mobile terminal 200.

The user input for sharing the selected content with the call counterpart can be implemented in various ways. FIG. 12 is a diagram for one example to describe an example of a user input. Referring to FIG. 12, after at least one content has been selected from a content list shown in FIG. 12 (*a*), the second controller sets at least one partial region of the second touchscreen as a sharing region 1210 for making a request for a sharing with a call counterpart and is then able to display the set sharing region 1210. Thereafter, referring to FIG. 12 (*b*), if the selected content is dragged to the sharing region 1210, the second controller can make a request for sharing the selected content with the call counterpart.

In the example shown in FIG. 12, the second controller may be set to display the sharing region while the touchscreen is touched with a pointer. In doing so, the second controller may be set to prevent a location of the sharing region from overlapping a location of the touch with the pointer.

FIG. 12 just shows one example of the user input for sharing the selected content with the call counterpart, by which the present invention may be non-limited. Unlike the example shown in FIG. 12, the user input may include one of: i) an action of selecting at least one content from a plurality of contents to share with a call counterpart and then touching a button for making a request for a sharing with the call counterpart; and ii) an action of selecting at least one content from a plurality of contents to share with a call counterpart and then flicking the selected content in a prescribed direction.

In FIG. 6, the step S606 is performed after the step S605. Yet, the step S606 can be performed at any time while the content list is displayed.

If a user input for requesting the sharing with the call counterpart is inputted while a specific content is displayed instead of the content list (cf. FIG. 12), the second controller can request the first mobile terminal 200 to make a request for the specific content currently displayed through the second touchscreen to the call counterpart.

Figure 13:
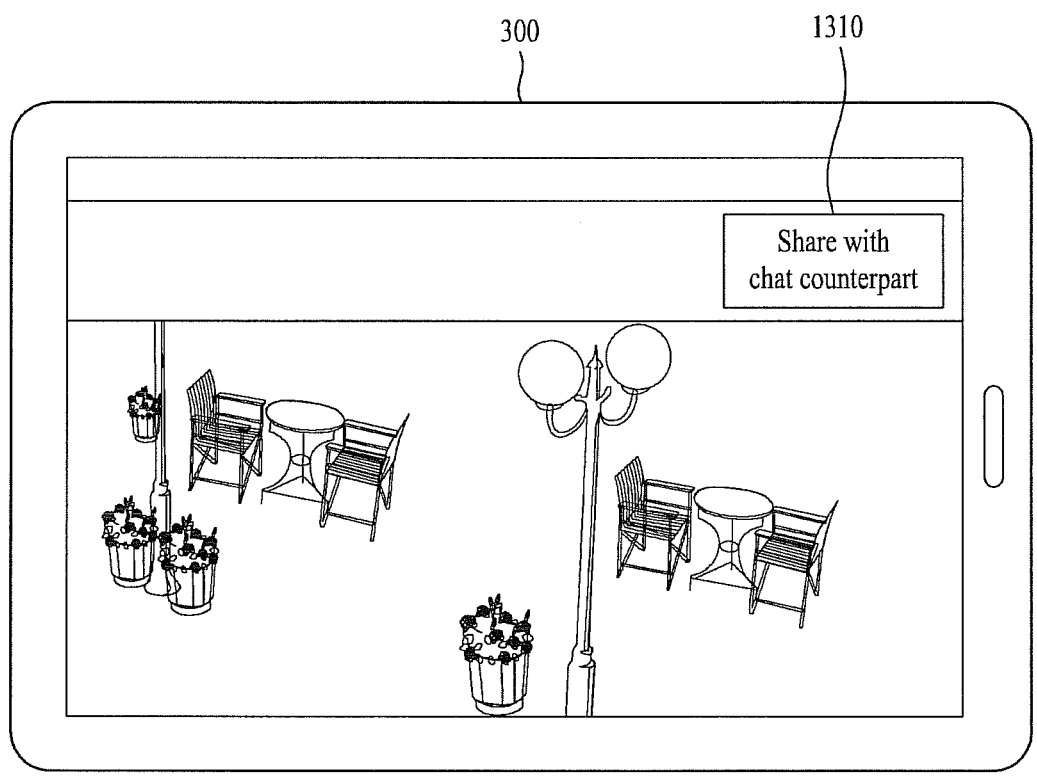
FIG. 13 is a diagram for one example of a user input for sharing a specific content displayed through a second touchscreen with a call counterpart.

For instance, FIG. 13 is a diagram for one example of a user input for sharing a specific content displayed through a second touchscreen with a call counterpart. Referring to FIG. 13, while a specific content is displayed through the second touchscreen, if a button 'share with a call counterpart' 1310 is touched, the second controller can make a request for sharing the specific content currently displayed through the second touchscreen with the call counterpart to the first mobile terminal 200.

According to the present invention, the second mobile terminal 300 displays a list of contents to share with a call counterpart and is also able to display a posting related to the call counterpart by extracting the call counterpart related posting from a plurality of postings uploaded to an SNS server after accessing a user's SNS account. A process for simultaneously displaying an SNS account accessed screen and a list of contents to share with a call counterpart is described in detail with reference to FIG. 14 as follows.

Figure 14:
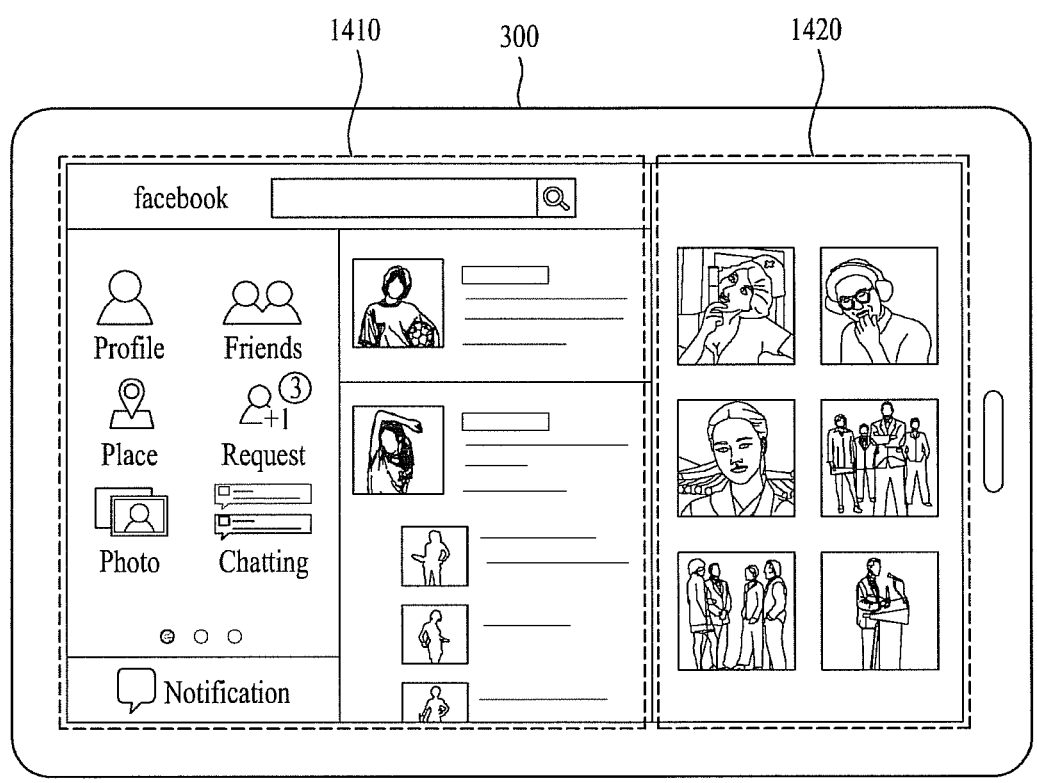
FIG. 14 is a diagram for one example to describe a process for simultaneously displaying both an SNS account accessed screen and a list of contents to share with a call counterpart.

FIG. 14 is a diagram for one example to describe a process for simultaneously displaying both an SNS account accessed screen and a list of contents to share with a call counterpart. For clarity of the following description, assume that a type of a content to be shared with a call counterpart is an image.

Referring to FIG. 14, the second controller partitions the second touchscreen into two regions including a first region 1410 and a second region 1420. The second controller can control an SNS account accessed screen to be displayed through the first region 1410. And, the second controller can control a list of contents, which are to be shared with a call counterpart, to be displayed through the second region 1420.

In doing so, when the SNS account accessed screen is displayed on the first region 1410, the second controller extracts a posting (e.g., a posting containing an image taken together with the call counterpart, a posting containing a comment of the call counterpart, a posting containing a substance related to the call counterpart, etc.) related to the call counterpart from a plurality of postings uploaded to an SNS server and is then able to control the extracted posting to be outputted through the first region 1410 only.

In displaying the list of the contents to share with the call counterpart, as shown in the former examples described with reference to FIG. 8 and FIG. 11, the second controller may control a content list associated with the call counterpart to be displayed or may control a content list associated with a chat substance.

Thereafter, after at least one content has been selected from the content list displayed on the second region 1420, if a user input for dragging the selected content to the first region 1410 is applied, the second controller can control the content, which has been dragged to the first region 1410, to be uploaded to the SNS account of the user. Hence, the user can upload the content associated with the call counterpart or the content associated with the chat substance to the SNS account easily and conveniently.

While a specific content is displayed through the second region 1420, if a drag input to the first region 1410 from the second region 1420 is applied, the second controller may be able to control the specific content to be uploaded to the user's SNS account.

Referring now to FIG. 6, when the spaced distance from the first mobile terminal 200 is equal to or smaller than the preset distance, if the first mobile terminal 200 receives a content from the call counterpart at any time, the second mobile terminal 300 can receive the content, which has been received from the call counterpart by the first mobile terminal 200, from the first mobile terminal 200 [S608]. If the content is received from the first mobile terminal 200, the second controller can control the content received from the first mobile terminal 200 to be displayed [S609]. Hence, the second mobile terminal 300 can provide the user with the convenience in checking the content transmitted from the call counterpart while the user continues the phone call.

In FIG. 2 and FIG. 6, after the communication channel between the first mobile terminal 200 and the second mobile terminal 300 has been established, it is determined whether the spaced distance between the first mobile terminal 200 and the second mobile terminal 300 is equal to or smaller than the preset distance. On the other hand, if the reciprocally spaced distance between the first mobile terminal 200 and the second mobile terminal 300 becomes equal to or smaller than the preset distance, the first mobile terminal 200 and the second mobile terminal 300 may establish a communication channel in-between. In this case, the preset distance between the first mobile terminal 200 and the second mobile terminal 300 can be set to belong to a short range communication possible range.

According to the above-described embodiment, if the mobile terminal 200 in the course of the phone call is located close to the second mobile terminal 300, the second mobile terminal 300 specifies a content sharing counterpart as the call counterpart. Hence, the user can be provided with the convenience in designating the sharing counterpart as the content sharing target directly without searching for the sharing targets one by one.

Accordingly, embodiments of the present invention provide various effects and/or features.

First of all, the present invention provides a mobile terminal and controlling method thereof, thereby enhancing user's convenience.

In particular, the present invention provides a mobile terminal and controlling method thereof, whereby a sharing target can be determined easily and conveniently without a plurality of user inputs in a manner of specifying a call counterpart as the sharing target.

The present invention provides a mobile terminal and controlling method thereof, whereby data can be shared with a call counterpart easily and conveniently through an external terminal device.

The present invention provides a mobile terminal and controlling method thereof, whereby a shared content can be checked easily and conveniently through an external terminal device.

And, the present invention provides a mobile terminal and controlling method thereof, whereby a user's phone call can be assisted in a manner of controlling an external terminal device to output a call substance as a text.

It will be appreciated by those skilled in the art that the present invention can be specified into other form(s) without departing from the spirit or scope of the inventions.

In addition, the above-described methods can be implemented in a program recorded medium as processor-readable codes. The processor-readable media may include all kinds of recording devices in which data readable by a processor are stored. The processor-readable media may include ROM, RAM, CD-ROM, magnetic tapes, floppy discs, optical data storage devices, and the like for example and also include carrier-wave type implementations (e.g., transmission via Internet).

It will be appreciated by those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A display device comprising:
    a wireless communication unit configured to communicate with a mobile terminal, wherein the mobile terminal is currently in a phone call with a counterpart terminal;
    a touchscreen configured to display information; and
    a controller configured to:
        detect whether a distance between the display device and the mobile terminal is shorter than a preset distance,
    wherein the controller is configured to:
        receive a first content list from the mobile terminal when the distance between the display device and the mobile terminal is detected to be shorter than the preset distance, wherein the received first content list includes at least one content,
        receive a text data from the mobile terminal, wherein the text data is converted from a voice during the phone call of the mobile terminal and the counterpart terminal, wherein the first content list includes at least one content related to the text data,
        sort at least one content related to the text data to be preferentially ahead of the rest of the contents of the first content list,
        display, at the touchscreen, the first content list, and
        in response to a user input selecting an item in the arranged first content list, request the mobile terminal to share a content that includes the selected item with the counterpart terminal.

2. The display device of claim 1, wherein the at least one content includes at least one selected from the group comprising a video having the user taken therein, a picture having the user taken therein, a schedule data of recording schedule of the user and a memo data of recording personal information of the user.

3. The display device of claim 1, wherein when a word indicating a specific location is included in the text data, the first content list includes a picture that is taken at the specific location.

4. The display device of claim 1, wherein the user input includes a dragging input dragging an item in the first content list to a sharing region of the touchscreen.

5. The display device of claim 1, further comprising a memory configured to store data, wherein the controller is configured to display, at the touchscreen, a second content list including at least one content stored in the memory, and in response to the user input selecting an item in the second content list, the controller to control the wireless communication unit to transmit, to the mobile terminal, a content corresponding to the selected item.

6. The display device of claim 1, wherein the controller is configured to display, at the touchscreen, a second content list including at least one content stored in a cloud server, and in response to the user input selecting an item in the second content list, the controller to control the wireless communication unit to transmit information of a content that includes the selected item.

7. A method of controlling a display device, comprising:
    establishing a communication channel with a mobile terminal that performs a phone call with a counterpart terminal;
    detecting whether a distance between the display device and the mobile terminal is shorter than a preset distance;
    receiving a first content list from the mobile terminal, when the distance between the display device and the mobile terminal is detected to be shorter than the preset distance, wherein the received first content list includes at least one content;
    receiving a text data from the mobile terminal, wherein the text data is generated by converting a voice during the phone call of the mobile terminal and the counterpart terminal, wherein the first content list includes at least one content related to the text data;
    sorting at least one content related to the text data to be preferentially ahead of the remainder of the contents of the first content list;
    displaying the first content list; and
    requesting the mobile terminal to share a content that includes the selected item with the counterpart terminal in response to the user input selecting an item in the first content list.

8. The method of claim 7, wherein when a word indicating a specific location is included in the text data, the first content list includes a picture that is taken at the specific location.

9. A mobile terminal comprising:
    a display unit configured to display information;
    a wireless communication unit configured to perform a phone call and communicate with a display device; and
    a controller configured to:
        extract at least one content to be shared with a counterpart terminal when the phone call with the counterpart terminal is performed,
        when a distance between the mobile terminal and the display device is determined to be shorter than a preset distance during the phone call, control a first content list of the extracted content to be transmitted to the display device, wherein the first content list includes at least one content;

transmit, to the display device, a text data converted from a voice during the phone call of the mobile terminal and the counterpart terminal, wherein the first content list includes at least one content related to the text data, and sort at least content related to the text data to be preferentially ahead of the rest of the contents of the first content list; and when a user input selecting a first item in the first content list is received from the display device, share a content that includes the first item with the counterpart terminal.

10. The mobile terminal of claim 9, wherein the controller is configured to control a second content list including at least one content stored in the memory to be transmitted to the display device, and wherein when information indicating a second item selected from the second content list is received from the display device, the controller is configured to share a content that includes the second item with the counterpart terminal.

11. A method of controlling a mobile terminal, comprising:

establishing a communication channel with a display device;

extracting at least one content when a phone call with a counterpart terminal is performed;

when a distance between the display device and the mobile terminal is determined to be shorter than a preset distance, transmitting a content list of the extracted content to the display device, wherein the content list includes at least one content;

transmitting, to the display device, a text data converted from a voice during the phone call of the mobile terminal and the counterpart terminal, wherein the first content list includes at least one content related to the text data, and sorting at least one content related to the text data to be preferentially ahead of the remainder of the contents of the first content list; and when a user input selecting an item selected from the content list is received, transmitting a content that includes the selected item to the counterpart terminal.

* * * * *